United States Patent
Richardson et al.

(10) Patent No.: US 6,829,733 B2
(45) Date of Patent: Dec. 7, 2004

(54) SYSTEM AND METHOD FOR GRAPHICALLY DETECTING DIFFERENCES BETWEEN TEST EXECUTIVE SEQUENCE FILES

(75) Inventors: Scott Richardson, Cedar Park, TX (US); Jose Hernandez, Pflugerville, TX (US); Patrick Christmas, Boulder, CO (US)

(73) Assignee: National Instruments Corporation, Austin, TX (US)

( * ) Notice: Subject to any disclaimer, the term of this patent is extended or adjusted under 35 U.S.C. 154(b) by 617 days.

(21) Appl. No.: 09/851,033

(22) Filed: May 7, 2001

(65) Prior Publication Data

US 2002/0166081 A1 Nov. 7, 2002

(51) Int. Cl.$^7$ .............................................. G06F 11/26
(52) U.S. Cl. ............................ 714/38; 714/33; 702/119
(58) Field of Search ...................... 714/38, 33; 717/111; 702/119

(56) References Cited

U.S. PATENT DOCUMENTS

| | | | | |
|---|---|---|---|---|
| 4,991,176 A | * | 2/1991 | Dahbura et al. | 714/738 |
| 5,633,813 A | * | 5/1997 | Srinivasan | 703/14 |
| 5,781,720 A | * | 7/1998 | Parker et al. | 714/38 |
| 5,878,050 A | * | 3/1999 | Brahme et al. | 714/719 |
| 6,138,270 A | | 10/2000 | Hsu | |
| 6,249,882 B1 | | 6/2001 | Testardi | |
| 6,301,701 B1 | | 10/2001 | Walker et al. | |
| 6,463,552 B1 | * | 10/2002 | Jibbe | 714/33 |
| 6,507,842 B1 | * | 1/2003 | Grey et al. | 707/5 |
| 6,546,524 B1 | * | 4/2003 | Chankramath et al. | 716/4 |
| 6,622,298 B1 | * | 9/2003 | Stamm | 717/125 |
| 6,647,513 B1 | * | 11/2003 | Hekmatpour | 714/37 |
| 6,654,911 B1 | * | 11/2003 | Miles | 714/38 |
| 6,748,584 B1 | * | 6/2004 | Witchel et al. | 717/136 |

OTHER PUBLICATIONS

Johnson, Laura, "Test and Measurement—Understanding Test Executives," Webpage www.testandmeasurement.com-.content/news/ , Oct. 16, 2000, pp. 1–9.

* cited by examiner

Primary Examiner—Scott Baderman
Assistant Examiner—Anne L. Damiano
(74) Attorney, Agent, or Firm—Meyertons Hood Kivlin Kowert & Goetzel, P.C.; Jeffrey C. Hood

(57) ABSTRACT

An improved method and system for detecting differences between first and second test executive sequence files in a computer system. Each of the test executive sequence files may comprise a plurality of interrelated objects. The objects may be compared and differences between the objects may be displayed. The objects may comprise one or more of: a sequence; a global variable; and/or a data type. A sequence may comprise: a step, a parameter, and/or a local variable. A step of a sequence may comprise a tree structure of step properties. Each step property may comprise one or more of: a property value, property flags, and/or a property comment. An object may comprise a hierarchy of objects (e.g., a parent object and a child sub-object). Differences between the hierarchy of objects may be detected. Differences may be navigated. Each displayed difference may be characterized as an insertion or a deletion.

21 Claims, 18 Drawing Sheets

SYSTEM AND METHOD FOR GRAPHICALLY DETECTING DIFFERENCES BETWEEN TEST EXECUTIVE SEQUENCE FILES

BACKGROUND OF THE INVENTION

1. Field of the Invention

The present invention relates to test executive software for organizing and executing test sequence files, e.g., test sequence files to measure and/or control instrumentation systems, and more particularly relates to a system and method for detecting differences between test sequence files.

2. Description of the Related Art

A test executive is a program that allows a user to organize and execute sequences (also referred to as test sequence files) of reusable test modules to automatically control a test, such as a test involving one or more instruments or devices or software applications. The test modules often have a standard interface and typically can be created in a variety of programming environments. The test executive software operates as the control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature.

Code Module—A program module, such as a Windows Dynamic Link Library (.dll), Java class file, LabVIEW VI (.vi), or other software program, object, or component etc., that contains one or more functions that perform a specific test or other action.

Test Module—A code module that performs a test.

Step—Any action, such as calling a test module to perform a specific test, that the user may include within a sequence of other actions.

Step Module—A code module called by a step.

Sequence—A series of steps that the user specifies for execution in a particular order. Whether and when a step is executed may depend on the results of previous steps.

Subsequence—A sequence called by another sequence. The user specifies a subsequence call as a step in the calling sequence.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface may be separate application programs or different aspects of the same program.

Test Executive Engine—A module or set of modules that provide an application programming interface (API) for creating, editing, executing, and debugging sequences. A sequence editor or run-time operator interface may use the services of a test executive engine.

Application Development Environment (ADE)—A programming environment such as LabVIEW, LabWindows/CVI, Microsoft Visual Basic, Borland Delphi or Microsoft Visual C++, in which the user may create test modules and run-time operator interfaces.

Unit Under Test (UUT)—A device or component that is being tested; may include software and/or hardware elements.

In many cases it is useful to provide users with the ability to define variables and properties which affect the execution behavior of a test executive sequence. For example, a particular step may be used in testing a group of different devices, but the step may need to use different limit values for each device. In this example, properties for the limit values may be defined for the step, and the property values may be changed as necessary for each device, without requiring any modifications to the code module that the step calls.

As the underlying unit under test changes over time, the corresponding test executive sequences may need adjustments. The user may edit the test executive sequences based upon the new or improved functionality of the unit under test. Thus, it would be desirable to provide a way to automatically determine and display differences between various versions of test executive sequences and steps, to assist the user (e.g., a test developer) in determining the correctness of the new versions of the test executive sequences. In particular, it would be desirable to compare the data structures of various versions of test executive sequences and steps, and to display the resulting differences in a graphical user interface.

SUMMARY OF THE INVENTION

The present invention provides various embodiments of an improved method and system for detecting differences between a first test executive sequence file and a second test executive sequence file in a computer system. The first test executive sequence file and the second test executive sequence file may be stored in a computer memory. The first test executive sequence file may comprise a first plurality of interrelated objects. Similarly, the second test executive sequence file may comprise a second plurality of interrelated objects. The first plurality of objects in the first test executive sequence file may be compared with the second plurality of objects in the second test executive sequence file. The comparison may involve comparison of the underlying data structures which represent the respective test executive sequence files. Based on the comparison, differences between the first plurality of objects and the second plurality of objects may be detected. An indication of the differences may be displayed on a display.

Both the first plurality of objects and the second plurality of objects may comprise one or more of: a sequence; a global variable; and/or a data type. In one embodiment, both the first plurality of objects and the second plurality of objects may comprise one or more of: at least one sequence; at least one global variable; and/or at least one data type. The first plurality of objects may comprise a first sequence, wherein the first sequence comprises: at least one step, at least one parameter, and at least one local variable. Similarly, the second plurality of objects may comprise a second sequence, wherein the second sequence comprises: at least one step, at least one parameter, and at least one local variable. The at least one step of the first sequence may comprise a tree structure of step properties, wherein each step property comprises one or more of: a property value, one or more property flags, and/or a property comment. Similarly, the at least one step of the second sequence may comprise a tree structure of step properties, wherein each step property comprises one or more of: a property value, one or more property flags, and/or a property comment.

The first plurality of objects and the second plurality of objects may share at least one common object. The shared common object may comprise a hierarchy of objects. The hierarchy of objects may comprise a parent object and at least one child sub-object. The hierarchy of objects of the common object in the first plurality of objects may be compared with the hierarchy of objects of the common object in the second plurality of objects. Differences between the hierarchy of objects of the common object in the first plurality of objects and the hierarchy of objects of the common object in the second plurality of objects may be detected. An indication of the differences may be displayed on a display. The indication of the differences may be navigated in order to display details of the differences. Additionally, a type of difference may be displayed for each displayed difference. The type of difference may be an insertion or a deletion. A count of differences may also be displayed.

BRIEF DESCRIPTION OF THE DRAWINGS

A better understanding of the present invention can be obtained when the following detailed description of the preferred embodiment is considered in conjunction with the following drawings, in which:

FIG. 4a is a screen shot of step objects in a first sequence file according to one embodiment of the present invention;

FIG. 4b is a screen shot of step objects in a second sequence file according to one embodiment of the present invention;

FIG. 13 is a screen shot of Parameters differences, comparing a first sequence file and a second sequence file according to one embodiment of the present invention;

FIG. 14 is a screen shot of Locals differences, comparing a first sequence file and a second sequence file according to one embodiment of the present invention;

FIG. 16 is a screen shot of Limits differences, comparing a first sequence file and a second sequence file according to one embodiment of the present invention;

DETAILED DESCRIPTION OF THE PREFERRED EMBODIMENTS

Incorporation by Reference

The TestStand product user documentation, available from National Instruments Corporation, is hereby incorporated by reference as though fully and completely set forth herein.

Figure 1:
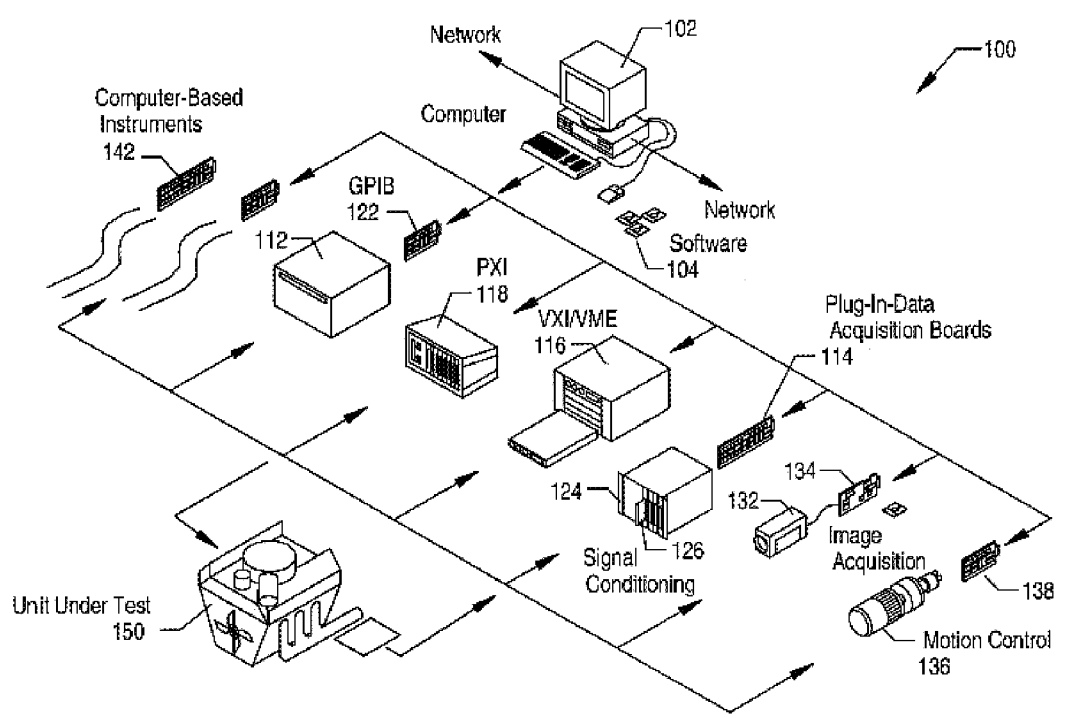
FIG. 1 illustrates an instrumentation control system according to one embodiment of the present invention.

FIG. 1: Instrumentation System

FIG. 1 illustrates an example instrumentation control system 100. FIG. 1 is exemplary only, and the present invention may be used in any of various systems, as desired.

The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150 (or multiple UUTs or processes).

The one or more instruments may include a GPIB instrument 112 and associated GPIB interface card 122, a data acquisition (DAQ) board 114 and associated signal conditioning circuitry 124, a VXI/VME instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102.

In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises a SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI/VME chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired. The system 100 may be used in a data acquisition and control application, in a test and measurement application, a process control application, an industrial automation application, or a man-machine interface application, among others.

The computer system 102 preferably includes a memory medium on which one or more computer programs according to the present invention are stored. The term "memory medium" is intended to include an installation media, e.g., a CD-ROM, or floppy disks 104; a computer system memory such as DRAM, SRAM, EDO RAM, etc.; or a non-volatile memory such as a magnetic medium, e.g., a hard drive, or optical storage. The memory medium preferably stores test executive software for creating and/or controlling an automated test system. Further, the test executive software may include logic for detecting differences between test executive sequence files. The host computer CPU executing code and data from the memory medium comprises a means for creating and executing programs that detect differences between test executive sequence files, according to the methods described below. The test executive software allows the user to create, configure, and/or control test sequence execution for various test applications, such as production and manufacturing test applications.

The TestStand test executive software, available from National Instruments, includes features such as described herein for detecting differences between test executive sequence files. The programs that detect differences between test executive sequence files may be stored on the memory medium of the computer system 102 and may execute on the computer system 102, or the programs that detect differences between test executive sequence files may be located on another computer system, such as a computer system accessible to the computer system 102 via a network.

Figure 2:
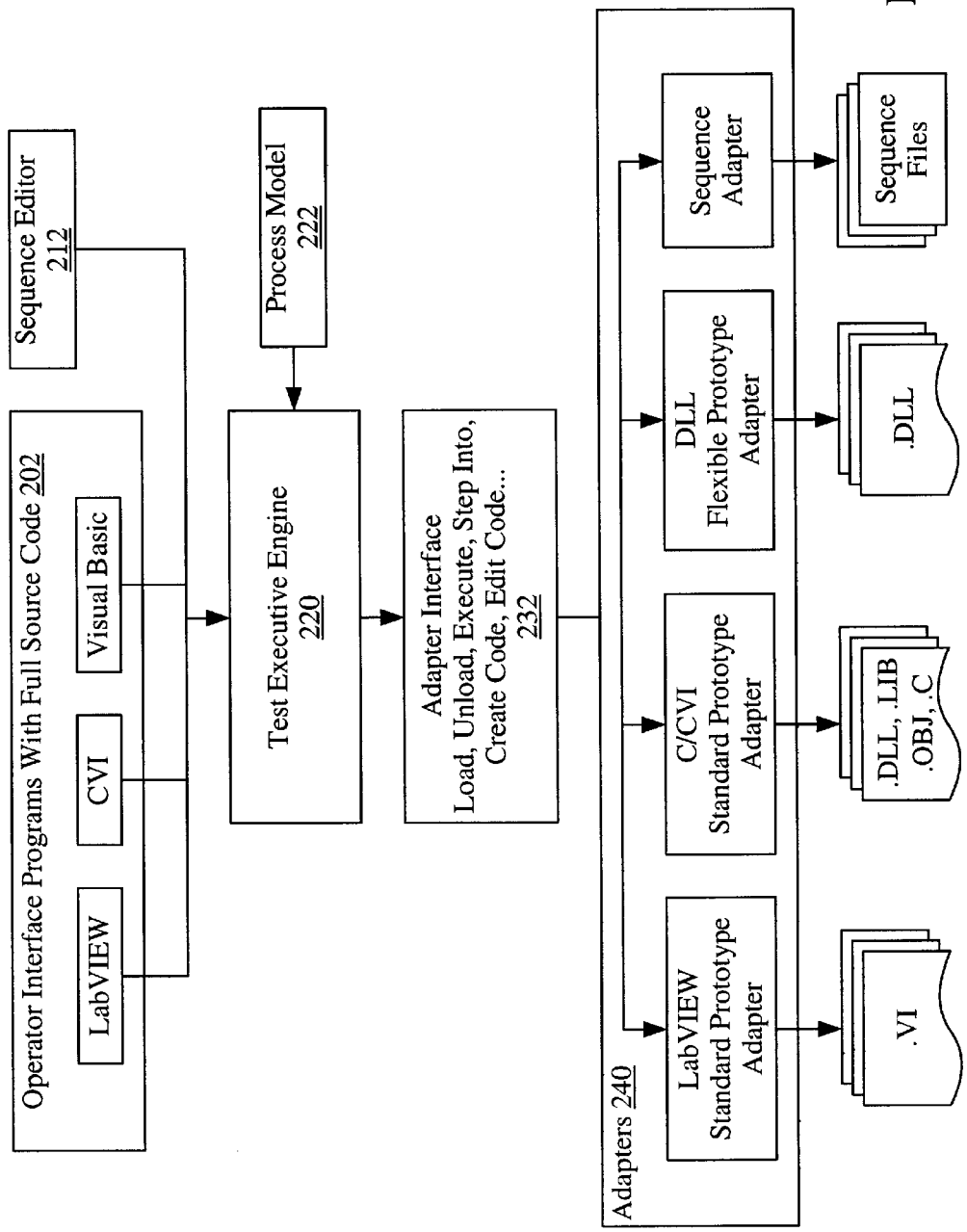
FIG. 2 illustrates a test executive application software architecture according to one embodiment of the present invention.

FIG. 2: Test Executive Software Architecture

FIG. 2 is a block diagram illustrating high-level architectural relationships between elements of one embodiment of a test executive software application. In one embodiment, the elements of FIG. 2 are comprised in the TestStand test executive product from National Instruments. It is noted that FIG. 2 is exemplary, and the present invention may be applied to any of various test executive applications having any of various architectures. As shown, the test executive software includes operator interface programs 202 for interfacing to various software programs. The operator interface programs 202 shown in FIG. 2 are for interfacing to the LabVIEW, LabWindows CVI, and Visual Basic software programs. However, additional operator interface programs 202 may be included for interfacing to other software programs.

The test executive software also includes a sequence editor 212 for editing sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 2 include the LabVIEW standard prototype adapter, the C/CVI standard prototype adapter, the DLL flexible prototype adapter, and the sequence adapter. The LabVIEW standard prototype adapter interfaces to programs having a VI extension, i.e., LabVIEW graphical programs. The C/CVI standard prototype adapter interfaces to programs having a .dll, .lib, .obj, or .c extension. The DLL flexible prototype adapter interfaces to programs having a .dll extension. The sequence adapter interfaces to sequence file programs.

As shown in FIG. 2, the test executive engine 220 plays a pivotal role in the test executive architecture. The test executive engine 220 runs sequences. Sequences contain steps that may call external code modules. By using module adapters 240 that have the standard adapter interface 232, the test executive engine 220 may load and execute different types of code modules. Test executive sequences may call sub-sequences through the common adapter interface 232. The test executive may use a special type of sequence called a process model to direct the high-level sequence flow. The test executive engine 220 exports an ActiveX Automation API used by the sequence editor 212 and run-time operator interfaces 202.

The sequence editor 212 is an application program in which the user creates, modifies, debugs, and diffs (i.e., compares the differences between two test sequences) test sequences. The sequence editor 212 provides the user easy access to the test executive features, such as step types and process models. The sequence editor 212 includes debugging tools found in application development environments such as LabVIEW, LabWindows/CVI, and Microsoft Visual C/C++. These debugging tools may include breakpoints, single stepping, stepping into or stepping over function calls, tracing a variable, and a watch window.

In the sequence editor 212, the user may start multiple concurrent executions of a test sequence. Multiple instances of the same test sequence may be executed, and different test sequences may be executed at the same time. Each execution instance has its own execution window. In trace mode, the execution window displays the steps in the currently executing test sequence. When execution is suspended, the execution window displays the next step to execute and provides single-stepping options.

In the example illustrated in FIG. 2, the test executive includes three run-time operator interfaces 202 provided to the end user in both source and executable form. Each run-time operator interface 202 is preferably a separate application program. The operator interfaces 202 differ primarily based on the language and application development environment in which each is developed. In FIG. 2, run-time operator interfaces developed in LabVIEW, LabWindows/CVI and Visual Basic are shown.

Although the user may use the sequence editor 212 at a production station, the run-time operator interfaces 202 are simpler to use and are fully customizable. Like the sequence editor 212, the run-time operator interfaces 202 allow the user to start multiple concurrent executions, set breakpoints, and single step. Unlike, the sequence editor 212, however, in the present embodiment the run-time operator interfaces 202 do not allow the user to modify sequences, and they do not display sequence variables, sequence parameters, step properties, and so on.

The user may customize one of the run-time operator interfaces 202 by modifying the source code for the program and the source documents for the manual. If the user desires to write user-defined run-time operator interfaces 202, the source code of one of the run-time operator interfaces 202 may be used as a starting point.

The test executive engine 220 is used for creating, editing, executing, debugging, and diffing (i.e., comparing the differences between two test sequences) test sequences. In one embodiment, the test executive engine 220 comprises a set of DLLs that export an object-based or component-based API, preferably an ActiveX Automation API. The sequence editor 212 and run-time operator interfaces 202 may use a Test Executive Engine API (Engine API). The user may call the Engine API from any programming environment that supports access to ActiveX Automation servers. Thus, the user may call the Engine API from test modules, including test modules that are written in LabVIEW and LabWindows/CVI.

Most steps in a test executive sequence invoke code in another sequence or in a code module. When invoking code in a code module, the test executive knows the type of the code module, how to call it, and how to pass parameters to it. The different types of code modules may include LabVIEW VIs, C functions in DLLs, and C functions in source, object, or library modules that are created in LabWindows/CVI or other compilers. The test executive also knows the list of parameters that the code module requires.

In the preferred embodiment, the test executive uses module adapters 240 to obtain this calling convention knowledge. In one embodiment, the test executive provides the following module adapters:

DLL Flexible Prototype Adapter—Allows the user to call C functions in a DLL with a variety of parameter types.

LabVIEW Standard Prototype Adapter—Allows the user to call any LabVIEW VI that has the test executive standard G parameter list.

C/CVI Standard Prototype Adapter—Allows the user to call any C function that has the test executive standard C parameter list. The function may be in an object file, library file, or DLL. The C function may also be in a source file that is in the project that the user is currently using in the LabWindows/CVI development environment.

Sequence Adapter—Allows the user to call sub-sequences with parameters.

The module adapters 240 contain other important information in addition to the calling convention and parameter lists. If the module adapter 240 is specific to an application development environment (ADE), the adapter knows how to bring up the ADE, how to create source code for a new code module in the ADE, and how to display the source for an existing code module in the ADE. The DLL Flexible Prototype Adapter may query a DLL type library for the parameter list information and display it to the sequence developer.

The following sections provide an overview of features and building blocks that are used to create test sequences and entire test systems in one embodiment of a test executive application. It is noted that these sections describe one specific embodiment, but the ideas and features may be applied to or may be altered for many other test executive applications.

Variables and Properties

The test executive application provides the user various places, referred to as variables and properties, in which data values may be stored. Variables are properties that the user may freely create in certain contexts. Variables may be global to a sequence file or local to a particular sequence. The values of "station" global variables are persistent across different executions and even across different invocations of the sequence editor 212 or run-time operator interfaces 202. The test executive engine maintains the value of station global variables in a file on the run-time computer system.

Each step in a sequence may have properties. For example, a step may have an integer error code property or properties affecting execution of the step. A step may have step-specific properties, or the type of a step may determine the set of properties that are associated with the step. Step types are discussed below.

Test executive variables may be used to share data among tests that are written in different programming languages, even if they do not have compatible data representations. Values that are stored in variables and properties may be passed to code modules. The test executive ActiveX API is useable to access variable and property values directly from code modules. When executing sequences, the test executive maintains a "sequence context" that contains references to all global variables and all local variables and step properties in active sequences. The contents of the sequence context change depending on the currently executing sequence and step. If the user passes a sequence context object reference to the code module, the test executive ActiveX API may be used to access the variables and properties in the sequence context.

Expressions

The values of variables and properties may be used in numerous ways, such as passing a variable to a code module or using a property value to determine whether to execute a step. The user may desire to use an expression, which is a formula that calculates a new value from the values of multiple variable or properties. An expression may be used anywhere a simple variable or property value is used. In expressions, the user may access all variables and properties in the sequence context that are active when the test executive evaluates the expression. The following is an example of an expression:

Locals.MidBandFrequency=(Step.HighFrequency+Step.LowFrequency)/2

The test executive may support all applicable expression operators and syntax that are used in C, C++, Java, and Visual Basic. The test executive may also provide an expression browser dialog box that the user may access, if the user is not familiar with expressions in these standard languages. The expression browser allows the user to interactively build an expression by selecting from lists of available variables, properties, and expression operators. The expression browser also lists a number of functions that the user may use in expressions. The expression browser has help text for each expression operator and function.

Categories of Properties

A property is a container of information. A property may contain a single value, an array of values of the same type, or no value at all. A property may also contain any number of sub-properties. Each property has a name. A value is a number, a string, or a Boolean. Values are not containers and thus cannot contain sub-properties. Arrays of values may have multiple dimensions.

The following are examples of categories of properties in one embodiment according to the kinds of values they contain:

A "single-valued" property may contain a single value, e.g., Number properties, String properties, and Boolean properties.

An "array" property may contain an array of values, e.g., Number Array properties, String Array properties, and Boolean Array properties.

A "property-array" property may contain a value that is an array of sub-properties of a single type. In addition to the array of sub-properties, property-array properties may contain any number of sub-properties of other types.

An "object" property may contain no values. Typically, object properties contain multiple sub-properties. Object properties are analogous to structures in C/C++ and to clusters in LabVIEW.

Standard and Custom Named Data Types

When the user creates a variable or property, the user specifies its data type. In some cases, a simple data type such as a number or a Boolean is used. In other cases, the user may create a user-defined data type by creating a named data type, in which sub-properties are added to create an arbitrarily complex data structure. When a named data type is created, the user may reuse the named data type for multiple variables or properties. Although each variable or property that the user creates with a named data type has the same data structure, the values they contain may differ.

The test executive may define certain standard named data types. The user may add sub-properties to the standard data types, but the user cannot delete any built-in sub-properties. The standard named data types are Path, Error, and CommonResults.

The user may create user-defined custom named data types. The user may choose a unique name for each of the custom data types. Sub-properties in each custom data type may be added or deleted without restriction. For example, the user may create a "Transmitter" data type that contains sub-properties such as "NumChannels" and "Power Level". When the user creates a variable or property, the user may select from among the simple property types and the named data types.

Built-In and Custom Properties

The test executive defines a number of properties that are always present for objects such as steps and sequences. An example is the step run mode property. The test executive normally hides these properties in the sequence editor, although it allows the user to modify some of them through dialog boxes. Such properties are called built-in properties.

The user may define new properties in addition to the built-in properties. Examples are high and low limit properties in a step, or local variables in a sequence. Such properties are called "custom" properties.

Steps

A sequence comprises a series of steps. A step may do many things, such as initializing an instrument, performing a complex test, or making a decision that affects the flow of execution in a sequence. Steps may perform these actions through several types of mechanisms, including jumping to another step, executing an expression, calling a sub-sequence or calling an external code module. The term "step module" is used to refer to the code module that a step calls.

Steps may have custom properties. For steps that call code modules, custom step properties are useful for storing parameters to pass to the code module for the step. They also serve as a place for the code module to store its results. The test executive ActiveX API may be used to access the values of custom step properties from code modules.

Not all steps call code modules. Some steps perform standard actions that the user configures using a dialog box. In this case, custom step properties are useful for storing the user-specified configuration settings.

Built-In Step Properties

Steps have a number of built-in properties that the user may specify using the various tabs on the Step Properties dialog box. These built-in step properties may include: preconditions, load/unload options, run mode, record results, step failure causes sequence failure, ignore run-time errors, post actions, loop options, pre expressions, post expression, and status expression.

Preconditions allow the user to specify the conditions that must be true for the test executive to execute the step during the normal flow of execution in a sequence. Load/Unload Options allow the user to control when the test executive loads and unloads the code modules or sub-sequences that each step invokes. Run Mode allows the user to skip a step or to force it to pass or fail without executing the step module. Record Results allows the user to specify whether the test executive stores the results of the step in a list. Record Results is discussed further below with respect to Results Collection.

Step Failure Causes Sequence Failure allows the user to specify whether the test executive sets the status of the sequence to "Failed" when the status of the step is "Failed". Ignore Run-Time Errors allows the user to specify whether the test executive continues execution normally after the step even when a run-time error occurs in the step. Post Actions allows the user to execute callbacks or jump to other steps after executing the step, depending on the pass/fail status of the step or any custom condition. Loop Options allow the user to cause a single step to execute multiple times before executing the next step. The user may specify the conditions under which to terminate the loop. The user may also specify whether to collect results for each loop iteration, for the loop as a whole, or for both.

Pre Expressions allows the user to specify an expression to evaluate before executing the step module. Post Expression allows the user to specify an expression to evaluate after executing the step module. Status Expression allows the user to specify an expression to use to set the value of the "status" property of the step automatically.

Step Types

In the specific embodiment under discussion, each step has a step type in a similar manner to which each variable or property has a data type. A step type may contain any number of custom properties. (It is noted that other embodiments of test executive applications may not support step types, but may still allow properties to be associated with individual steps.) Each step of a step type has the custom step properties in addition to the built-in step properties. The phrase "step of a step type" may also be referred to as an instance of the step type. All steps of the same type may have the same properties, but the values of the properties may differ. The step type specifies the initial values of all the step properties. When the user creates the step in the sequence editor, the test executive sets the initial or default values of the step properties from the values that the step type specifies. The user may modify the values of the built-in step properties by using the Step Properties dialog box. Usually, the user may modify the values of custom step properties using a dialog box specific to the step type. If the step type does not have a dialog box for the custom properties, the user may view the custom properties by selecting "View Contents" from the context menu for the step. Although step modules typically do not modify the values of the built-in step properties at run-time, they often modify and interrogate the values of the custom step properties.

A step type essentially comprises a custom set of properties and/or operations associated with a step. Stated another way, a step type defines common operations and/or data that are associated with a test module in a similar way that a process model defines functionality associated with calling the main sequence. A step type is also similar to a data type for a variable or property. The test module is hard coded, and the step type represents operations and/or properties associated with calling this test module. A step type is a modular, identifiable unit configured by the user, preferably through a graphical user interface, e.g., dialogs.

In a test sequence with a number of steps, in many instances the user will desire a number of steps that have some commonality of functionality and/or properties. A primary purpose of a step type is to define, in a single location, common properties and/or operations associated with a plurality of steps referred to as the step type, thereby eliminating the need for the user to define these common properties and/or operations with each of the respective steps. The user may thus incorporate this common functionality and/or properties in a step type, rather than requiring the user to hard code that functionality and/or properties in each step. The functionality and/or properties defined by a step type is generally peripheral or associated with the actual test or the step being performed.

For example, it may be desirable to handle the return data a certain way, and the user desires this return data handling functionality for a number of different steps. The user has the ability to create a step type which defines this commonality, i.e., defines a standard way that the step type will handle the data. Therefore the step type makes it easier to reuse return data handling code for all the steps that will have that same common functionality of handling data. Thus steps (instances) of this type are easier to configure, since the common functionality does not need to be re-coded for each step. The user also may want to define properties around a class of steps to provide more configurability. This is done by creating or configuring a step type for the class of steps, wherein the step type defines the common properties.

As discussed below, step types define common functionality by defining an edit sub-step, a pre-step sub-step, and a post-step sub-step. The edit sub-step is similar to the configuration entry point in the process model. Similarly, the pre-step sub-step and the post-step sub-step are similar to the execution entry point in the process model.

The edit sub-step allows the user to configure the peculiarities of a particular instance of a step type. For instance the edit sub-step may be configured to display or pop up a message to request user input regarding the number of buttons desired on a dialog. This message is displayed at configuration time, not run time.

As discussed above, step types may contain custom properties in addition to built-in step properties. The step type specifies the initial values of the step properties. The step type may also define standard behavior for each step of the respective step type, preferably using sub-steps, e.g., an edit sub-step, a pre-step sub-step and a post-step sub-step.

In creating the steps in a sequence, the user may want to select existing step types which will be common for one or more steps in a sequence or the user may want to configure new step types for a certain type of step which may be habitually used or used a plurality of times in a sequence.

A step type has similar functionality to a type definition, meaning that once the user has configured a step type and used it throughout different steps of the sequence, if the user later changes that step type, those changes propagate through all of the steps (instances) which are based on that step type.

The functionality performed by the step type as described is easily changeable due to its modular form, allowing for reuse or application to a plurality of steps, thus providing tremendous savings in developer (i.e., user) effort.

There are basically three different types of step types: step types that call code modules through any module adapter like CVI or LabVIEW; step types that require a particular module adapter; and step types that do not call code modules. A step type may also define standard behavior for each step of that type. The step type does this using a set of "sub-steps". Sub-steps are actions that the test executive engine performs for a step in addition to calling the step module. The sub-steps of a step type perform the same actions for every step of that type. The different types of sub-steps are as follows: Edit sub-step, Pre-step sub-step, and Post-step sub-step.

The sequence developer (i.e., user) may invoke the edit sub-step by selecting a menu item in the context menu for the step or by clicking a button on the Step Properties dialog for the step. The step type specifies the name of the menu item and the caption of the button. The edit sub-step displays a dialog box in which the sequence developer may edit the values of custom step properties. For example, an edit sub-step might display a dialog box in which the sequence developer specifies the high and low limits for a test. The edit sub-step may then store the high and low limit values as step properties.

The test executive engine 220 may call the pre-step sub-step before calling the step module. The user may specify an adapter and a module to invoke in the pre-step sub-step. For example, a pre-step sub-step may call a code module that retrieves measurement configuration parameters into step properties for use by the step module.

The test executive engine 220 may call the post-step sub-step after calling the step module. The user may specify an adapter and a module to invoke in the post-step sub-step. A post-step sub-step may call a code module that compares the values that the step module stored in step properties against limit values that the edit sub-step stored in other step properties.

The test executive may contain a set of predefined step types, including: Action Numeric Limit Test, String Value Test, Pass/Fail Test, Label, Goto, Statement, Limit Loader, Message Popup, Call Executable, and Call Sequence.

Although the user may create a test application using only the predefined step types, the user may also create user-defined step types. By creating user-defined step types, the user may define standard, reusable classes of steps that apply specifically to the user's application. For example, the user may define a Switch Matrix Configuration step or a Transmitter Adjacent Channel Power Test step.

The sequence developer may create a new step by selecting the "Insert Step" item in the context menu that appears when the user right clicks on a sequence window. The "Insert Step" item may bring up a hierarchical sub-menu containing the step types available on the computer system. When the user creates a new step type, the user may specify the new step type name and position within the sub-menu.

Source Code Templates

When the user creates a step type, the user may also define source code templates for that step type. When the sequence developer creates a new step of a particular user-defined step type, the sequence developer may use a source code template to generate source code for the step module. For a particular step type, the user may specify different source code templates for the different module adapters.

Sequences

In one embodiment, a sequence may comprise the following: any number of local variables, any number of parameters, a main group of steps, a group of setup steps, a group of cleanup steps, and built-in sequence properties.

Sequence Parameters

Each sequence may have its own list of parameters. The user may specify the number of parameters and the data type of each parameter. The user may also specify a default value for each parameter. When the sequence developer creates a step that calls one sequence from another sequence, the sequence developer may specify the values to pass for the parameters of the sub-sequence. If the sequence developer does not specify the value of a parameter, the test executive engine 220 passes the default value. The user may use the test executive ActiveX API to access sequence parameter values from code modules that "step in" the sequence call.

Sequence Local Variables

The user may create an unlimited number of local variables in a sequence. The user may use local variables to store data relevant to the execution of the sequence. The user may use the test executive ActiveX API to access local variables from code modules that "step in" the sequence call. The user may also pass local variables by value or by reference to any step in the sequence that calls a sub-sequence or that calls a DLL using the Flexible DLL Prototype Adapter.

Lifetime of Local Variables, Parameters, and Custom Step Properties

Multiple instances of a sequence may run at the same time. Multiple instances of a sequence may occur when the user calls a sequence recursively or when a sequence runs in multiple concurrent executions. Each instance of the sequence has it own copy of sequence parameters, local variables, and custom properties of each step. When a sequence completes, the test executive engine 220 discards the values of the parameters, local variables, and custom properties.

Step Groups

A sequence may contain the following groups of steps: Setup, Main, and Cleanup. When the test executive executes a sequence, the steps in the Setup group execute first, the steps in the Main group execute second, and the steps in the Cleanup group execute last. Typically, the Setup group contains steps that initialize instruments, fixtures, or a UUT, and launches necessary applications. The Main group usually contains the bulk of the steps in a sequence, including the steps that test the UUT. The Cleanup group typically contains steps that power down or de-initialize the instruments, fixtures, and UUT, or perform software-related cleanup if the UUT comprises a software application.

One of the reasons for having separate step groups is to ensure that the steps in the Cleanup group execute regardless of whether the sequence completes successfully or a run-time error occurs in the sequence. If a Setup step or Main step causes a run-time error to occur, the flow of execution jumps to the Cleanup step group. The Cleanup steps always run even if some of the Setup steps do not run. If a Cleanup step causes a run-time error, execution may continue at the next Cleanup step.

If a run-time error occurs in a sequence, the test executive engine 220 reports the run-time error to the calling sequence. Execution in the calling sequence jumps to the Cleanup group in the calling sequence. This process continues up through the top-level sequence. Thus, when a run-time error occurs, the test executive engine 220 terminates execution after running all the Cleanup steps of the sequences that are active at the time of the run-time error.

Built-in Sequence Properties

Sequences may have built-in properties that the user specifies using the Sequence Properties dialog. For example, the user may specify that the flow of execution jumps to the Cleanup step group whenever a step sets the status property of the sequence to "Failed".

Sequence Files

Sequence files may contain one or more sequences. Sequence files may also contain global variables. Sequence file global variables may be accessed by all sequences in the sequence file. Sequences files may have built-in properties that the user specifies using the Sequence File Properties dialog. For example, the user may specify Load and Unload Options that over-ride the Load and Unload Options of all the steps in all the sequences in the file.

Sequences may contain steps that conduct tests, set up instruments, or perform other actions necessary to test a UUT. Sequence files may also contain the definitions for the data types and step types that are used by the sequences in the file. The sequence editor may be used to create and edit sequence files. Sequences may be executed from the sequence editor or from any other test executive operator interface program.

The various types of sequence files include normal sequence files, model sequence files, station callback sequence files, and front-end callback sequence files. Normal sequence files may contain sequences that test a UUT, and these are the most common type of sequence file. Model sequence files may contain process model sequences. Station callback sequence files may contain station callback sequences. Front-end callback sequence files may contain front-end callback sequences.

Figure 3:
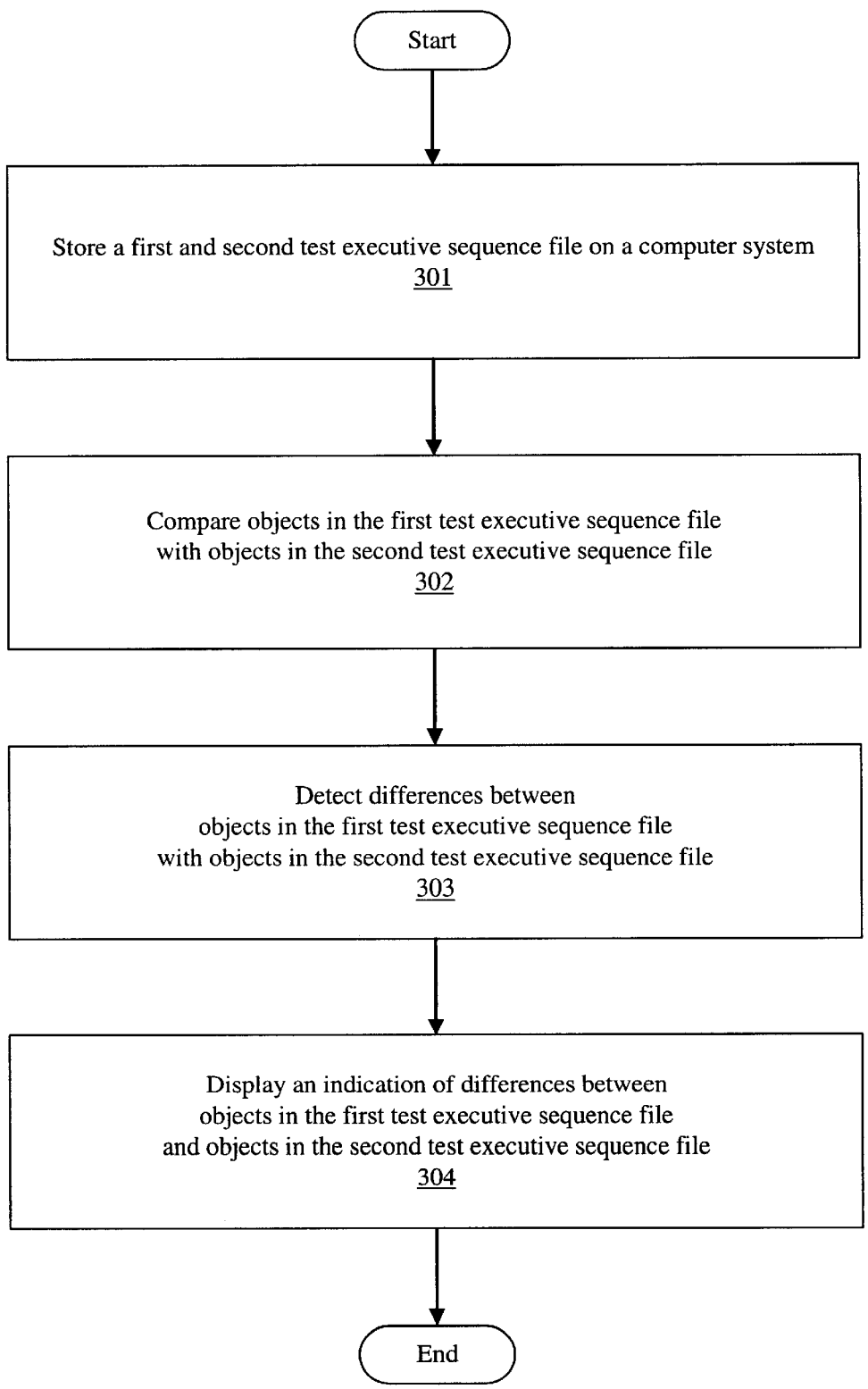
FIG. 3 is a flowchart diagram illustrating one embodiment of a method for detecting differences between test executive sequence files.

FIG. 3: Method for Detecting Differences between Test Executive Sequence Files FIG. 3 is a flowchart diagram illustrating one embodiment of a method for detecting differences between test executive sequence files.

In step 301, a first test executive sequence file may be stored in a computer memory and a second test executive sequence file may be stored in the computer memory. The first test executive sequence file may include a first plurality of interrelated objects. Similarly, the second test executive sequence file may include a second plurality of interrelated objects. The second test executive sequence file may be a modification or revision (i.e., a different version) of the first test executive sequence file. In this instance, the user may desire to "diff" the two versions of the test executive sequence file to determine the differences between the versions. Alternatively, the second test executive sequence file may be a different sequence file than the first test executive sequence file. In this instance, the user may simply desire to determine the differences between the two sequence files.

In step 302, the first plurality of objects in the first test executive sequence file may be compared with the second plurality of objects in the second test executive sequence file. The first plurality of objects may include one or more sequences, one or more global variables, and/or one or more data types. Similarly, the second plurality of objects may include one or more sequences, one or more global variables, and/or one or more data types. As used herein, a "sequence" may include a series of ordered steps. A sequence may have parameters and/or local variables, in addition to steps. A step may include a tree structure of step properties. Each step property may include one or more property values, one or more property flags, and/or a property comment.

The first plurality of objects and the second plurality of objects may each be represented on the memory medium as one or more data structures. The comparison performed in step 302 may comprise comparing the data structures representing the first plurality of objects with the data structures representing the second plurality of objects, including comparison of the various fields and parameters contained in the data structures.

It is noted that a simple text "diff" which performs a character-by-character comparison would not be useable to fully compare these data structures representing the first plurality of objects and the second plurality of objects. Thus the method performs a more complex comparison of the underlying data structures to determine differences between the two test executive sequence files. Thus the comparison performed in step 302 is not a simple text differencing step but rather involves comparison of the underlying data structures.

For more information on one embodiment of comparing data structures which represent graphical programs, please see U.S. Pat. Nos. 5,974,254 and 6,138,270, which are hereby incorporated by reference as though fully and completely set forth herein.

In step 303, differences between the first plurality of objects and the second plurality of objects may be detected. The first plurality of objects and the second plurality of objects may share common objects, yet have different values for the common objects. The common object may include a hierarchy of objects (e.g., a parent object and at least one child sub-object). The hierarchy of objects of the common object in the first plurality of objects may be compared with the hierarchy of objects of the common object in the second plurality of objects. Additionally, the first plurality of objects may include objects not found in the second plurality of objects, and the second plurality of objects may include objects not found in the first plurality of objects.

In step 304, an indication of the differences between the first plurality of objects and the second plurality of objects may be displayed on a display. In one embodiment, a user may select the indicator of the differences and thus navigate to a display of details of the differences. A type of difference for each displayed difference may be displayed. The type of difference may be an insertion or a deletion. A count of differences may also be displayed.

Figures 4A, 4B:
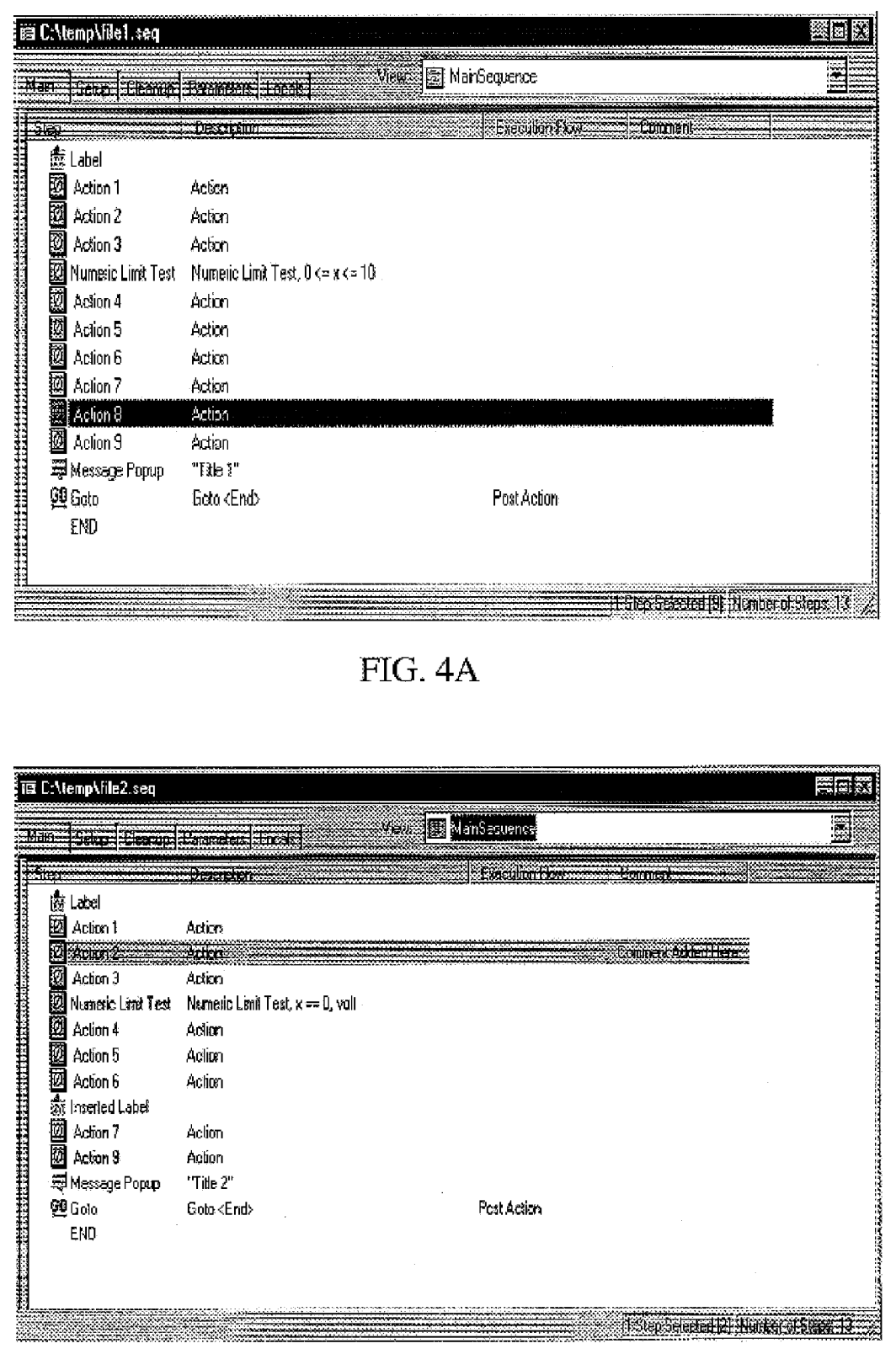

FIG. 4*a*: Step Objects in a First Sequence File

FIG. 4*a* is a screen shot of step objects in a first sequence file according to one embodiment of the present invention. The first sequence file is named file1.seq, in this example. A drop-down list of "Views" is available. The currently selected view is of the "MainSequence" of the test execution file (i.e., file1.seq).

Several tabs are shown at the top of FIG. 4*a*, indicating that separate screens of data may be displayed when a user selects one of the various tabs. The tabs include: Main, Setup, Cleanup, Parameters, and Locals. The tab in focus in FIG. 4*a* is the "Main" tab. It is noted that FIG. 5*a* displays the data shown when the "Parameters" tab is in focus, and that FIG. 6*a* displays the data shown when the "Locals" tab is in focus.

The steps displayed in the "Main" tab of FIG. 4*a* include: Label, Action 1, Action 2, Action 3, Numeric Limit Test, Action 4, Action 5, Action 6, Action 7, Action 8, Action 9, Message Popup, and Goto. A title line is shown above the steps; the columns shown in the title line include: Step, Description, Execution Flow, and Comment.

FIG. 4*b*: Step Objects in a Second Sequence File

FIG. 4*b* is a screen shot of step objects in a second sequence file according to one embodiment of the present invention. The second sequence file is named file2.seq, in this example. The currently selected view from the drop-down list of Views is the "MainSequence" of the test execution file (i.e., file2.seq).

The layout of the screen shot in FIG. 4*b* mirrors the layout shown in FIG. 4*a*, with the distinction that the data shown in FIG. 4*b* reflects the information stored in the second sequence file (i.e., file2.seq). It is noted that "Action 8", highlighted in FIG. 4*a* does not appear in FIG. 4*b* (i.e., "Action 8" does not exist in the second sequence file).

The steps displayed in the "Main" tab of FIG. 4*b* include: Label, Action 1, Action 2, Action 3, Numeric Limit Test, Action 4, Action 5, Action 6, Inserted Label, Action 7, Action 9, Message Popup, and Goto. Similar to FIG. 4*a*, a title line is shown in FIG. 4*b*, above the steps; the columns shown in the title line include: Step, Description, Execution Flow, and Comment. As shown in FIG. 4*b*, "Action 2" is highlighted to illustrate that a difference exists for this step (i.e., the second sequence file contains a comment for this step, "Action 2", whereas the first sequence file has no comment).

Figure 5A:
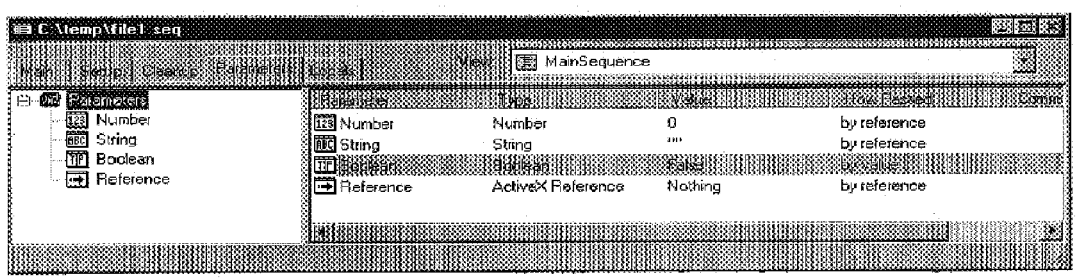
FIG. 5a is a screen shot of parameter objects in a first sequence file according to one embodiment of the present invention.

FIG. 5*a*: Parameter Objects in a First Sequence File

FIG. 5*a* is a screen shot of parameter objects in a first sequence file according to one embodiment of the present invention. The tab in focus in FIG. 5*a* is the "Parameters" tab.

The parameters displayed in the "Parameters" tab of FIG. 5*a* include: Number, String, Boolean, and Reference. A title line is shown above the parameters; the columns shown in the title line include: Parameter, Type, Value, How Passed, and Comment.

Figure 5B:
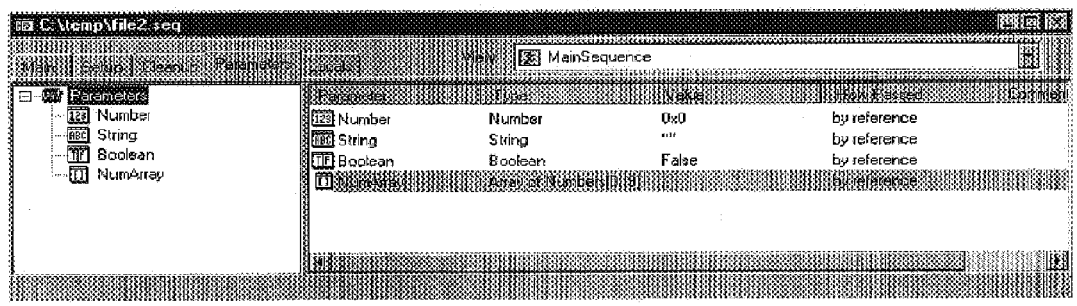
FIG. 5b is a screen shot of parameter objects in a second sequence file according to one embodiment of the present invention.

FIG. 5*b*: Parameter Objects in a Second Sequence File

FIG. 5*b* is a screen shot of parameter objects in a second sequence file according to one embodiment of the present invention. The tab in focus in FIG. 5*b* is the "Parameters" tab.

The layout of the screen shot in FIG. 5*b* mirrors the layout shown in FIG. 5*a*, with the distinction that the data shown in FIG. 5*b* reflects the information stored in the second sequence file (i.e., file2.seq).

The parameters displayed in the "Parameters" tab of FIG. 5*b* include: Number, String, Boolean, and NumArray. A title line is shown above the parameters; the columns shown in the title line include: Parameter, Type, Value, How Passed, and Comment.

Figure 6A:
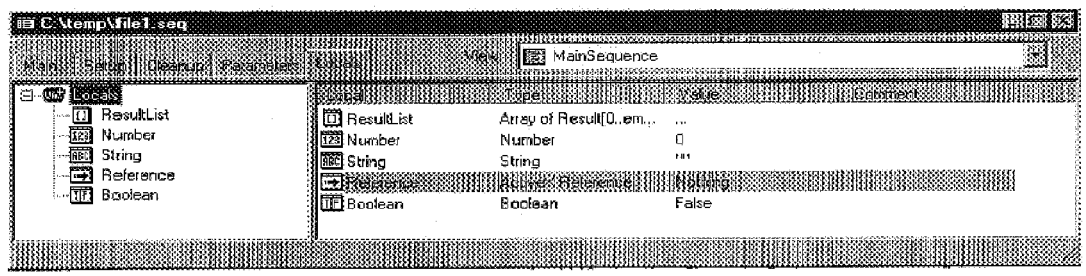
FIG. 6a is a screen shot of local variable objects in a first sequence file according to one embodiment of the present invention.

FIG. 6*a*: Local Variable Objects in a First Sequence File

FIG. 6*a* is a screen shot of local variable objects in a first sequence file according to one embodiment of the present invention. The tab in focus in FIG. 6*a* is the "Locals" tab.

The local variables displayed in the "Locals" tab of FIG. 6a include: ResultList, Number, String, Reference, and Boolean. A title line is shown above the local variables; the columns shown in the title line include: Local, Type, Value, and Comment.

Figure 6B:
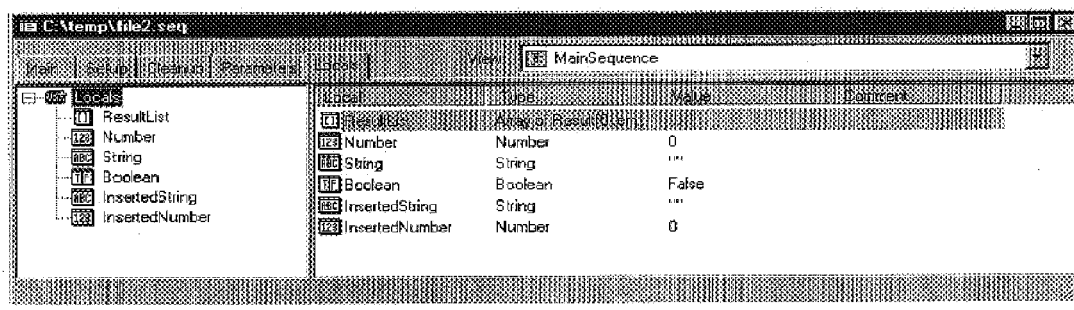
FIG. 6b is a screen shot of local variable objects in a second sequence file according to one embodiment of the present invention.

FIG. 6b: Local Variable Objects in a Second Sequence File

FIG. 6b is a screen shot of local variable objects in a second sequence file according to one embodiment of the present invention. The tab in focus in FIG. 6b is the "Locals" tab.

The layout of the screen shot in FIG. 6b mirrors the layout shown in FIG. 6a, with the distinction that the data shown in FIG. 6b reflects the information stored in the second sequence file (i.e., file2.seq).

The local variables displayed in the "Locals" tab of FIG. 6b include: ResultList, Number, String, Boolean, InsertedString, and InsertedNumber. A title line is shown above the local variables; the columns shown in the title line include: Local, Type, Value, and Comment.

Figure 7A:
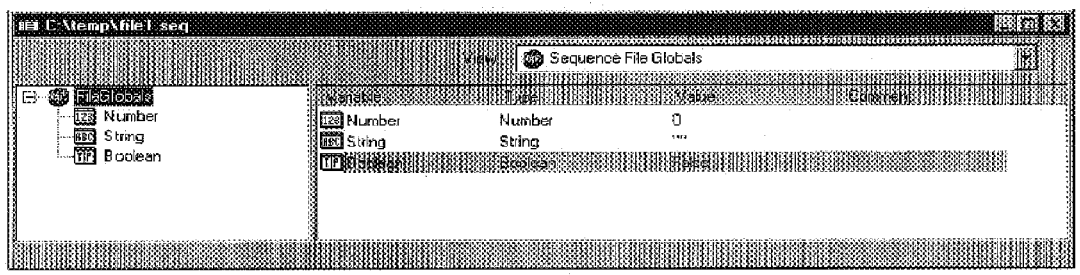
FIG. 7a is a screen shot of file global variable objects in a first sequence file according to one embodiment of the present invention.

FIG. 7a: Global Variable Objects in a First Sequence File

FIG. 7a is a screen shot of file global variable objects in a first sequence file according to one embodiment of the present invention. A drop-down list of "Views" is available. The currently selected view is of the "Sequence File Globals" of the test execution file (i.e., file1.seq).

The global variables displayed in the "Sequence File Globals" view of FIG. 7a include: Number, String, and Boolean. A title line is shown above the global variables; the columns shown in the title line include: Variable, Type, Value, and Comment.

Figure 7B:
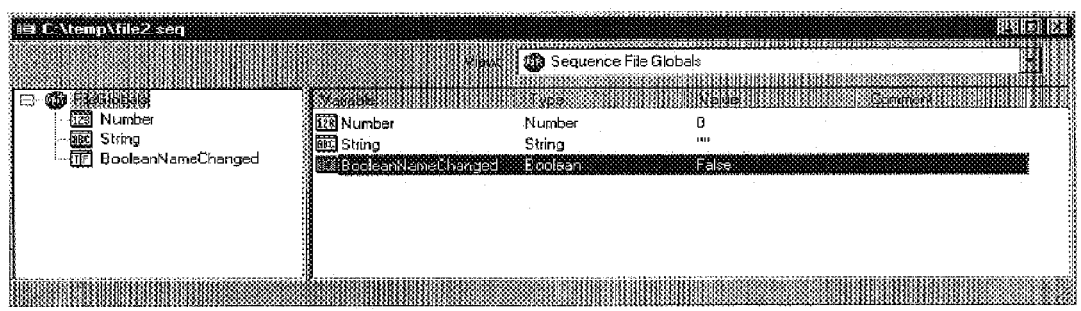
FIG. 7b is a screen shot of file global variable objects in a second sequence file according to one embodiment of the present invention.

FIG. 7b: Global Variable Objects in a Second Sequence File

FIG. 7b is a screen shot of file global variable objects in a second sequence file according to one embodiment of the present invention. The currently selected view is of the "Sequence File Globals" of the test execution file (i.e., file2.seq).

The layout of the screen shot in FIG. 7b mirrors the layout shown in FIG. 7a, with the distinction that the data shown in FIG. 7b reflects the information stored in the second sequence file (i.e., file2.seq).

The global variables displayed in the "Sequence File Globals" view of FIG. 7b include: Number, String, and BooleanNameChanged. A title line is shown above the global variables; the columns shown in the title line include: Variable, Type, Value, and Comment.

Figure 8A:
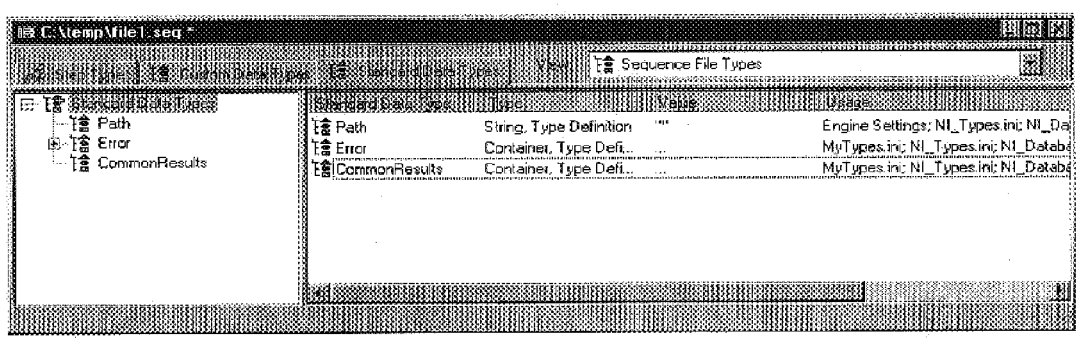
FIG. 8a is a screen shot of standard data type objects in a first sequence file according to one embodiment of the present invention.

FIG. 8a: Standard Data Type Objects in a First Sequence File

FIG. 8a is a screen shot of standard data type objects in a first sequence file according to one embodiment of the present invention. A drop-down list of "Views" is available. The currently selected view is of the "Sequence File Types" of the test execution file (i.e., file1.seq).

Several tabs are shown at the top of FIG. 8a, indicating that separate screens of data may be displayed when a user selects one of the various tabs. The tabs include: Step Types, Custom Data Types, and Standard Data Types. The tab in focus in FIG. 8a is the "Standard Data Types" tab.

The data types displayed in the "Standard Data Types" tab of FIG. 8a include: Path, Error, and CommonResults. A title line is shown above the data types; the columns shown in the title line include: Standard Data Type, Type, Value, and Usage.

Figure 8B:
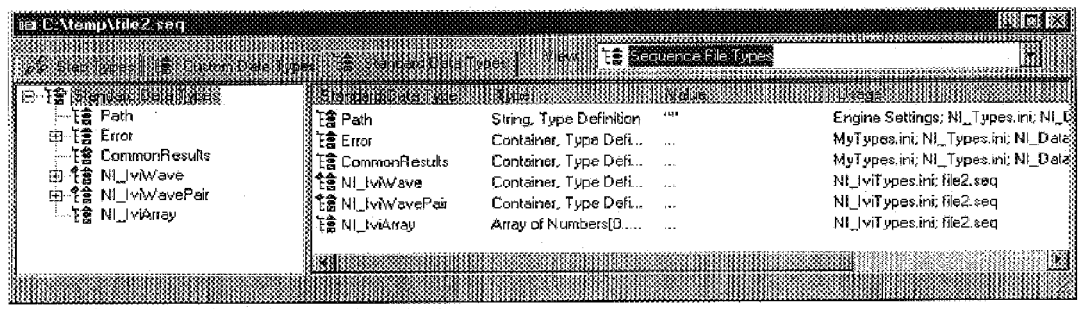
FIG. 8b is a screen shot of standard data type objects in a second sequence file according to one embodiment of the present invention.

FIG. 8b: Standard Data Type Objects in a Second Sequence File

FIG. 8b is a screen shot of standard data type objects in a second sequence file according to one embodiment of the present invention. The currently selected view is of the "Sequence File Types" of the test execution file (i.e., file2.seq).

The layout of the screen shot in FIG. 8b mirrors the layout shown in FIG. 8a, with the distinction that the data shown in FIG. 8b reflects the information stored in the second sequence file (i.e., file2.seq).

The data types displayed in the "Standard Data Types" tab of FIG. 8b include: Path, Error, CommonResults, NI_IviWave, NI_IviWavePair, and NI_IviArray. A title line is shown above the data types; the columns shown in the title line include: Standard Data Type, Type, Value, and Usage.

Figure 9A:
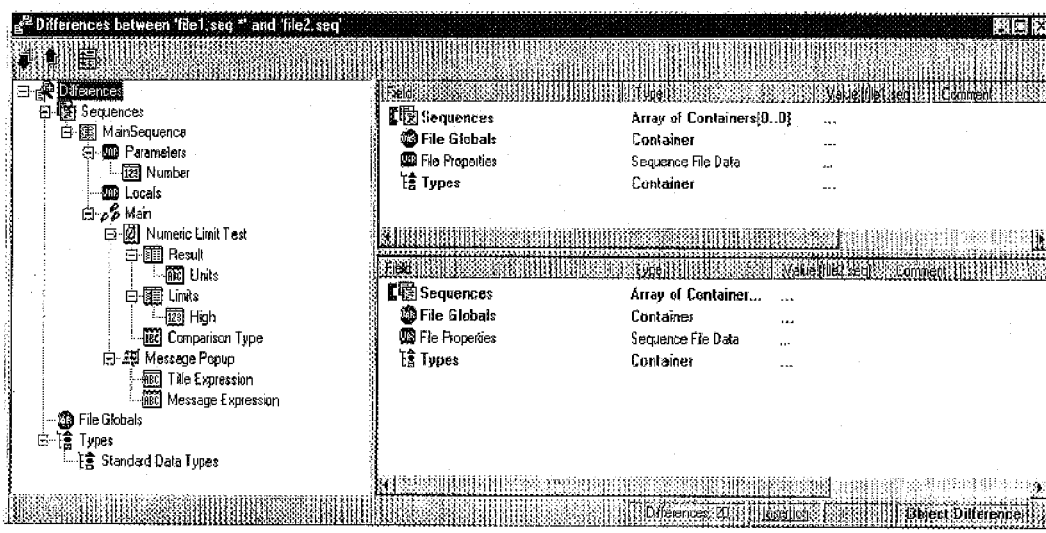
FIG. 9a is a screen shot of top level differences, comparing a first sequence file and a second sequence file according to one embodiment of the present invention.

FIG. 9a: Top Level Differences

FIG. 9a is a screen shot of top level differences, comparing a first sequence file and a second sequence file according to one embodiment of the present invention.

As shown on the left-side of the screen shot, any elements or nodes of the two sequence files that are found to be different when comparing the objects and sub-objects of the two sequence files are shown in a hierarchical structure. In one embodiment, an object or sub-object may appear in the hierarchical structure only if a difference for that object or sub-object is found between the two sequence files. If a sub-object has a difference, the corresponding parent object may also be shown to have a difference. For example, if the two sequence files had no differences (i.e., the two sequence files were exactly the same), then the hierarchical structure shown on the left-side of the screen shot would be empty.

The elements or nodes shown to have some differences between the two sequence files on the left-side of the screen shot include: Sequences, MainSequence, Parameters, Number, Locals, Main, Numeric Limit Test, Result, Units, Limits, High, Comparison Type, Message Popup, Title Expression, Message Expression, File Globals, Types, and Standard Data Types.

Upon a user selecting an element or node from the left-side of the screen shot, details relating to the selected element or node may be displayed on the right-side of the screen shot. The top half of the right-side of the screen shot may refer to information found in the first sequence file (i.e., file1.seq), and the bottom half of the right-side of the screen shot may refer to information found in the second sequence file (i.e., file2.seq), as indicated by the file name shown in the "Value" column heading.

As shown, the "Differences" element on the left-side of the screen shot is selected, thus the right-side of the screen shot may include the top-level elements of each sequence file (e.g., Sequences, File Globals, File Properties, and Types). It is noted that the top-level elements shown in Bold on the right-side of the screen shot may indicate that further details may be available concerning differences for those bold elements. By selecting a Bold element, a user may navigate to the screen shot containing the details regarding differences for that Bold element. The "File Properties" top-level element shown in standard text on the right-side of the screen shot may indicate that no differences exist for the element, when comparing the two sequence files.

A user may select any element shown on the left-side of the screen shot. Upon such a selection, details related to the selected element may be displayed on the right-side of the screen shot. Alternatively, the user may navigate or traverse through the various differences by selecting the up-arrow and/or the down-arrow shown at the top of the left-side of the screen shot. As either the up-arrow or the down-arrow are selected, the corresponding element shown on the left-side of the screen shot may be highlighted, and details related to the highlighted element may be displayed on the right-side of the screen shot (i.e., details from the first sequence file may appear in the top half of the right-side of the screen shot, and details from the second sequence file may appear in the bottom half of the right-side of the screen shot).

At the bottom of the right-side of the screen shot a total number of differences between the two sequence files may be shown (e.g., "Differences: 20"). If a particular difference is selected in either the top half of the right-side of the screen shot or in the bottom half of the right-side of the screen shot, the type of difference (e.g., Insertion, Deletion) may be noted at the bottom of the right-side of the screen shot, along with a short description of the type of difference (e.g., "Object Difference"). Information regarding the type of difference may be color-coded for ease of identification. The color-coding may be user configurable.

The bracket shown to the left of the term "Sequences" in both the top half of the right-side of the screen shot, and the bottom half of the right-side of the screen shot indicates that there are differences in sub-objects of the parent object "Sequences".

Figure 9B:
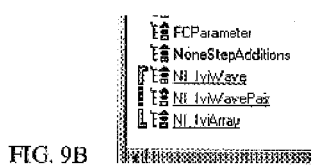
FIG. 9b is a screen shot of differences that apply across multiple objects in a first sequence file according to one embodiment of the present invention.

FIG. 9b: Differences that Apply Across Multiple Objects

FIG. 9b is a screen shot of differences that apply across multiple objects in a first sequence file according to one embodiment of the present invention. This figure is an embodiment of either the top half or the bottom half of the right-side of the screen shot of FIG. 9a.

Similar to the bracket discussed in FIG. 9a, the bracket shown to the left of the terms "NI_IviWave, NI_IviWavePair, and NI_IviArray" in FIG. 9b indicates that there are differences in sub-objects of the parent object "Types". The bracket shown in FIG. 9b is elongated (as compared to the bracket shown in FIG. 9a) to indicate that the differences apply across multiple objects.

Figure 10:
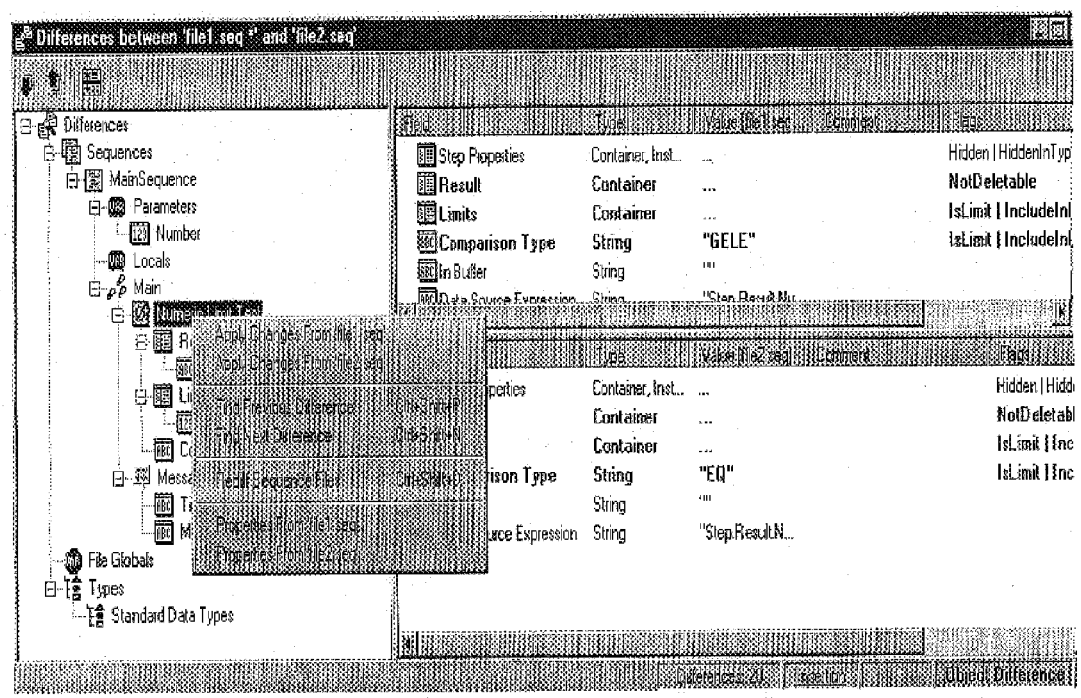
FIG. 10 is a screen shot of a first differences sub-menu according to one embodiment of the present invention.

FIG. 10: A First Differences Sub-menu

FIG. 10 is a screen shot of a first differences sub-menu according to one embodiment of the present invention.

The left-side of the screen shot in FIG. 10 is similar to the left-side of the screen shot in FIG. 9a. As shown in FIG. 10, the "Numeric Limit Test" element on the left-side of the screen shot is selected, thus the right-side of the screen shot may include child elements of the "Numeric Limit Test" parent element (e.g., Step Properties, Result, Limits, Comparison Type, In Buffer, and Data Source Expression). It is noted that the child elements shown in Bold on the right-side of the screen shot may indicate that further details may be available concerning differences for those bold elements. By selecting a Bold child element, a user may navigate to the screen shot containing details regarding differences for that Bold child element. The "Step Properties" child element shown in standard text on the right-side of the screen shot may indicate that no differences exist for the element, when comparing the two sequence files.

A pop-up window is shown in FIG. 10. In one embodiment, the pop-up window may appear when a user right clicks on an input device (e.g., a mouse) when pointing to one of the parent elements on the left-side of the screen shot (e.g., the "Numeric Limit Test" parent element). The pop-up window may be referred to as a sub-menu. Menu commands may be shown in the sub-menu (e.g., "Apply Changes From 'file1.seq'", "Apply Changes From 'file2.seq'", "Find Previous Difference", "Find Previous Difference Over" (not shown), "Find Next Difference", "Find Next Difference Over" (not shown), "Rediff Sequence Files", "Properties From 'file1.seq' . . . ", and "Properties From 'file2.seq' . . . ").

The "Apply Changes" menu commands, when selected, may take an action of updating one sequence file with the changes noted in the other sequence file. Thus the "Apply Changes From 'file1.seq'" menu command, when selected, may cause the file2.seq sequence file to be updated with the changes found in the file1.seq sequence file. Similarly, the "Apply Changes From 'file2.seq'" menu command, when selected, may cause the file1.seq sequence file to be updated with the changes found in the file2.seq sequence file.

The "Find Previous/Next Differences" menu commands (i.e., "Find Previous Difference", "Find Next Difference") may allow a user to navigate from one difference to another, and to see details related to the differences. For example, the "Find Next Difference" may search down and into the tree.

The "Find Previous/Next Differences Over" menu commands (i.e., "Find Previous Difference Over" (not shown), "Find Next Difference Over" (not shown)) may allow a user an alternate method of navigation (as compared to the "Find Previous/Next Differences" menu commands) from one difference to another, and to see details related to the differences. For example, the "Find Next Difference Over" may search down but not into the current node on the tree.

The "Rediff Sequence Files" menu command may be used after a change or edit has been made to the first sequence file and/or the second sequence file, to refresh the differences screens shown on the right-side of the screen shot.

The "Properties From" menu commands, when selected, may open an edit window containing the appropriate sequence file (i.e., the edit window may contain the contents of the first sequence file (file1.seq) when the "Properties From 'file1.seq' . . . " menu command is chosen, and similarly, the edit window may contain the contents of the second sequence file (file2.seq) when the "Properties From 'file2.seq' . . . " menu command is chosen). The user may then modify the selected sequence file, as desired.

Figure 11A:
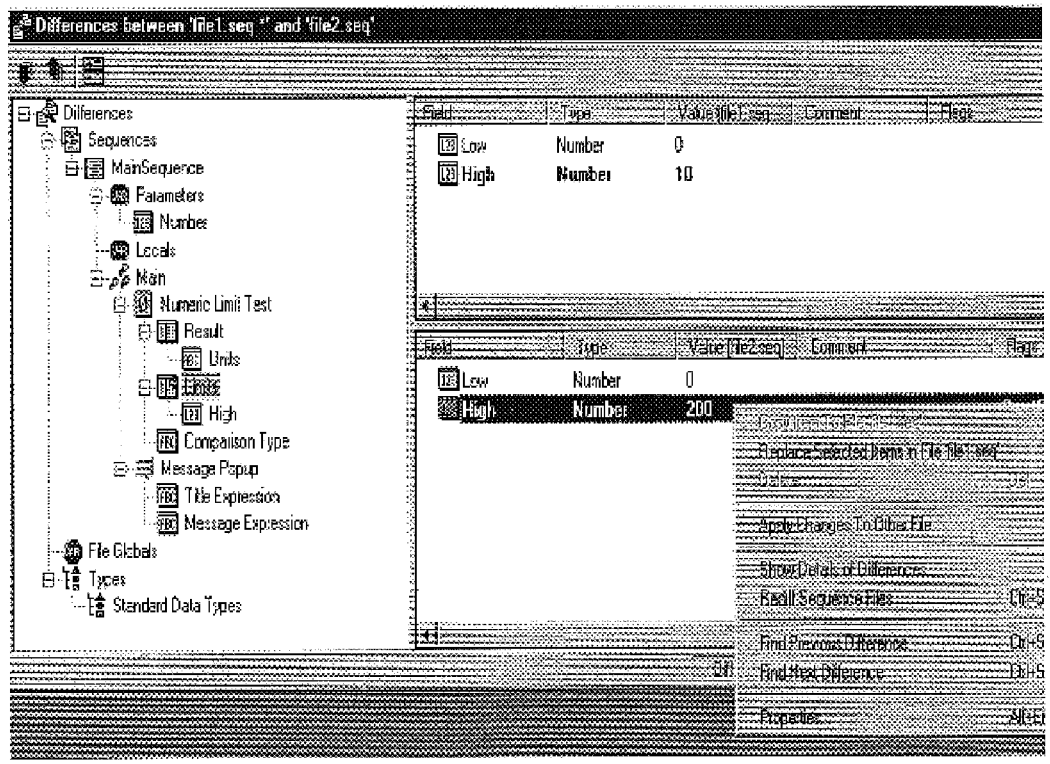
FIG. 11a is a screen shot of a second differences sub-menu according to one embodiment of the present invention.

FIG. 11a: A Second Differences Sub-menu

FIG. 11a is a screen shot of a second differences sub-menu according to one embodiment of the present invention.

The left-side of the screen shot in FIG. 11a is similar to the left-side of the screen shot in FIGS. 9a and 10. As shown in FIG. 11a, the "Limits" element on the left-side of the screen shot is selected, thus the right-side of the screen shot may include child elements of the "Limits" parent element (e.g., Low and High). It is noted that the "High" child element shown in Bold on the right-side of the screen shot may indicate that further details may be available concerning differences for that bold element. By selecting a Bold child element, a user may navigate to the screen shot containing details regarding differences for that Bold child element. The "Low" child element shown in standard text on the right-side of the screen shot may indicate that no differences exist for the element, when comparing the two sequence files.

A pop-up window is shown in FIG. 11a. In one embodiment, the pop-up window may appear when a user right clicks on an input device (e.g., a mouse) when pointing to one of the child elements on the right-side of the screen shot (e.g., the "High" child element shown in the bottom half of the right-side of the screen shot). The pop-up window may be referred to as a sub-menu. Menu commands may be shown in the sub-menu (e.g., "Replace Selected Items in File 'file1.seq'", "Apply Changes To Other File", "Show Details of Differences . . . ", "Rediff Sequence Files", "Find Previous Difference", "Find Previous Difference Over" (not shown), "Find Next Difference", "Find Next Difference Over" (not shown), and "Properties . . . "). As shown, certain menu commands may be disabled (e.g., "Copy Item To File 'file1.seq'" and "Delete") in certain situations.

The "Replace Selected Items" menu command, when selected, may take an action of replacing the value of user-selected items in one of the two sequence files. The "Replace Selected Items" menu command itself may contain the name of the sequence file in which changes or replacements will take place. Thus the "Replace Selected Items in File 'file1.seq'" menu command, when selected, may cause the file1.seq sequence file to be updated with the value of the user-selected items found in the file2.seq sequence file. Similarly, the "Replace Selected Items in File 'file2.seq'" menu command, when selected, may cause the file2.seq sequence file to be updated with the value of the user-selected items found in the file1.seq sequence file.

The "Apply Changes To Other File" menu command, when selected, may take an action similar to that described for the "Apply Changes" menu commands of FIG. 10. Thus the "Apply Changes To Other File" menu command, when selected from a menu appearing in the bottom half of the right-side of the screen shot (as shown in FIG. 11a), may cause the file1.seq sequence file to be updated with the changes found in the file2.seq sequence file. Similarly, when the "Apply Changes To Other File" menu command is selected from a menu appearing in the top half of the right-side of the screen shot (not shown in FIG. 11a), the selection may cause the file2.seq sequence file to be updated with the changes found in the file1.seq sequence file.

Figure 11B:
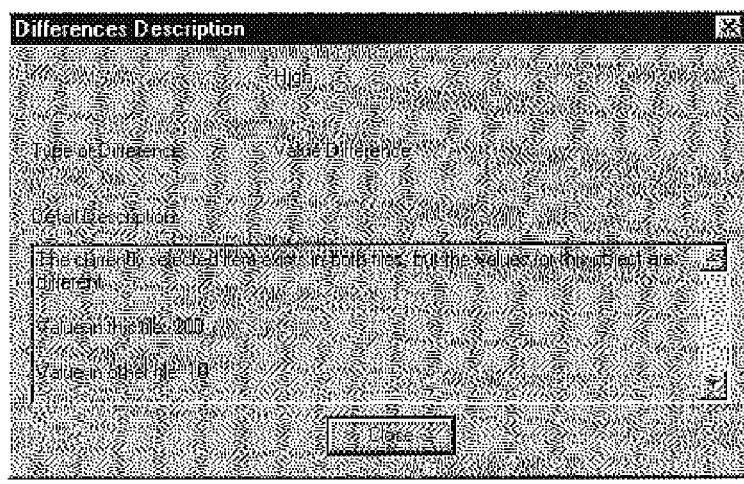
FIG. 11b is a screen shot of a pop-up window for one of the choices in the second differences sub-menu of FIG. 11a, according to one embodiment of the present invention.

The "Show Details of Differences . . . " menu command, when selected, may cause the pop-up window or dialog shown in FIG. 11b to be displayed. As shown in FIG. 11b, the dialog is read-only and thus the user is not able to make changes by selecting this menu command. The "High" child element is shown to exist in both files, but the values for the object are different. The value for each file may be displayed (e.g., "Value in this file: 200" and "Value in other file: 10"). In one embodiment, the user may have the option of editing one or both values.

The "Rediff Sequence Files" menu command may be used after a change or edit has been made to the first sequence file and/or the second sequence file, to refresh the differences screens shown on the right-side of the screen shot. This function may be similar to the menu choice shown in FIG. 10 sharing the same name (i.e., "Rediff Sequence Files").

The "Find Differences" menu commands (i.e., "Find Previous Difference", "Find Previous Difference Over" (not shown), "Find Next Difference", "Find Next Difference Over" (not shown)) may allow a user to navigate from one difference to another, and to see details related to the differences. This function may be similar to the menu choices shown in FIG. 10 sharing the same name (i.e., "Find Previous Difference", "Find Previous Difference Over" (not shown), "Find Next Difference", "Find Next Difference Over" (not shown)).

The "Properties . . . " menu command, when selected, may open an edit window containing the appropriate sequence file (i.e., the edit window may contain the contents of the first sequence file (file1.seq) when this menu command is chosen from a menu appearing in the top half of the right-side of the screen shot (not shown in FIG. 11a), and similarly, the edit window may contain the contents of the second sequence file (file2.seq) when this menu command is chosen from a menu appearing in the bottom half of the right-side of the screen shot (shown in FIG. 11a)). The user may then modify the selected sequence file, as desired.

FIG. 11b: A Pop-up Window for One of the Choices in the Second Differences Sub-menu FIG. 11b is a screen shot of a pop-up window for one of the choices in the second differences sub-menu of FIG. 11a, according to one embodiment of the present invention.

The "Show Details of Differences . . . " menu command, when selected, may cause the pop-up window or dialog shown in FIG. 11b to be displayed. As shown in FIG. 11b, the dialog is read-only and thus the user is not able to make changes by selecting this menu command. The "High" child element is shown to exist in both files, but the values for the object are different. The value for each file may be displayed (e.g., "Value in this file: 200" and "Value in other file: 10"). In one embodiment, the user may have the option of editing one or both values.

Figure 12:
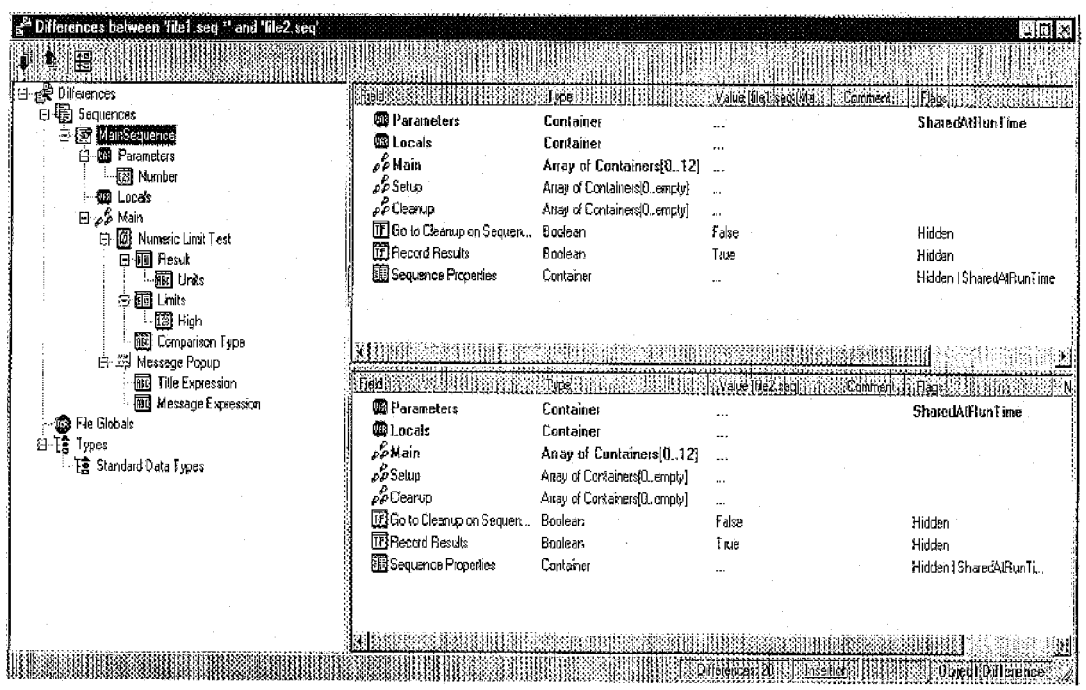
FIG. 12 is a screen shot of MainSequence differences, comparing a first sequence file and a second sequence file according to one embodiment of the present invention.

FIG. 12: MainSequence Differences

FIG. 12 is a screen shot of MainSequence differences, comparing a first sequence file and a second sequence file according to one embodiment of the present invention.

The left-side of the screen shot in FIG. 12 is similar to the left-side of the screen shot in FIG. 9a. As shown in FIG. 12, the "MainSequence" element on the left-side of the screen shot is selected, thus the right-side of the screen shot may include child elements of the "MainSequence" parent element (e.g., Parameters, Locals, Main, Setup, Cleanup, Go to Cleanup on Sequence, Record Results, and Sequence Properties). It is noted that the child elements shown in Bold on the right-side of the screen shot may indicate that further details may be available concerning differences for those bold elements. By selecting a Bold child element, a user may navigate to the screen shot containing details regarding differences for that Bold child element. The "Setup" child element shown in standard text on the right-side of the screen shot may indicate that no differences exist for the element, when comparing the two sequence files. Those child elements shown in standard text on the right-side of the screen shot (i.e., Setup, Cleanup, Go to Cleanup on Sequence, Record Results, and Sequence Properties) are not shown on the left-side of the screen shot, as no differences exist for these elements, when comparing the two sequence files.

Figure 13:
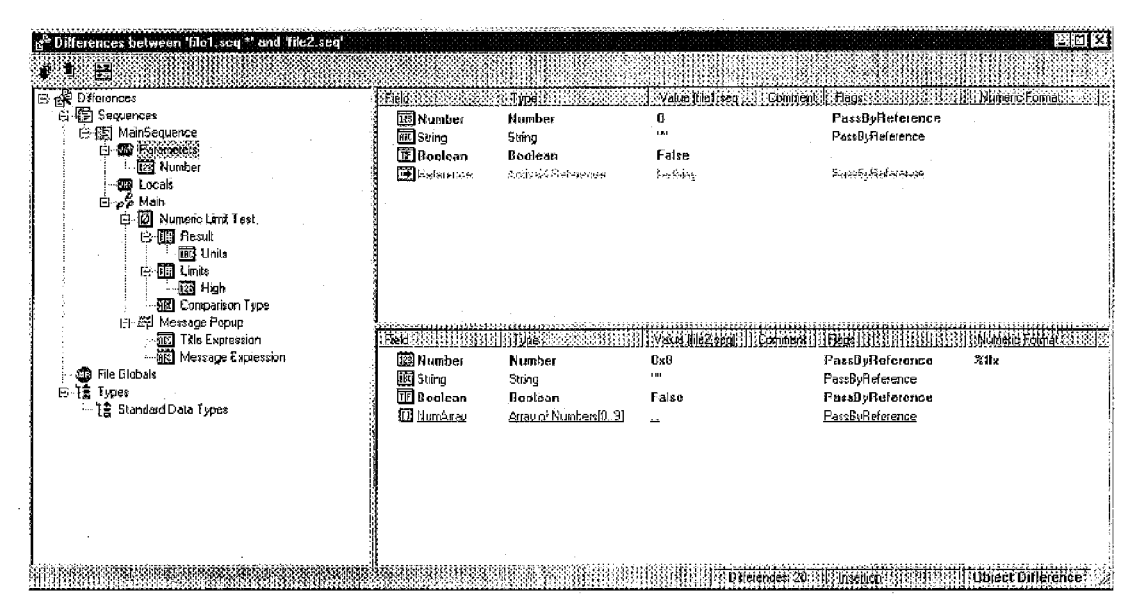

FIG. 13: Parameters Differences

FIG. 13 is a screen shot of Parameters differences, comparing a first sequence file and a second sequence file according to one embodiment of the present invention.

The left-side of the screen shot in FIG. 13 is similar to the left-side of the screen shot in FIG. 12. As shown in FIG. 13, the "Parameters" element on the left-side of the screen shot is selected, thus the right-side of the screen shot may include child elements of the "Parameters" parent element (e.g., Number, String, Boolean, Reference, and NumArray). It is noted that the child elements shown in Bold on the right-side of the screen shot may indicate that further details may be available concerning differences for those bold elements. By selecting a Bold child element, a user may navigate to the screen shot containing details regarding differences for that Bold child element. The "String" child element shown in standard text on the right-side of the screen shot may indicate that no differences exist for the element, when comparing the two sequence files.

Although not shown, the "Boolean" child element of the "Parameters" parent element should appear below the "Number" child element on the left-side of the screen shot, as there is a difference for the "Boolean" child element parameter between the two sequence files.

As shown in FIG. 13, the differences for the Number parameter are that the first sequence file (i.e., file1.seq) has a Value of "0" and a Numeric Format of "" (i.e., none specified), whereas the second sequence file (i.e., file2.seq) has a Value of "0x0" and a Numeric Format of "%#x". The Boolean parameter has the following differences: in the first sequence file (i.e., file1.seq) the Boolean parameter has a Flag of "" (i.e., none specified), and in the second sequence file (i.e., file2.seq) the Boolean parameter has a Flag of "PassByReference". In one embodiment, default values may be associated with various columns (e.g., Value, Flags, Numeric Format). For example, for a Boolean parameter, when no text is shown for the "Flags" column, that may indicate PassByValue, by default.

The Reference parameter, shown in the top half of the right-side of the screen shot may be shown with a line drawn through the middle of the text, indicating that the parameter is a deletion. An insertion of a NumArray parameter is shown in the bottom half of the right-side of the screen shot, indicated by an underline.

Figure 14:
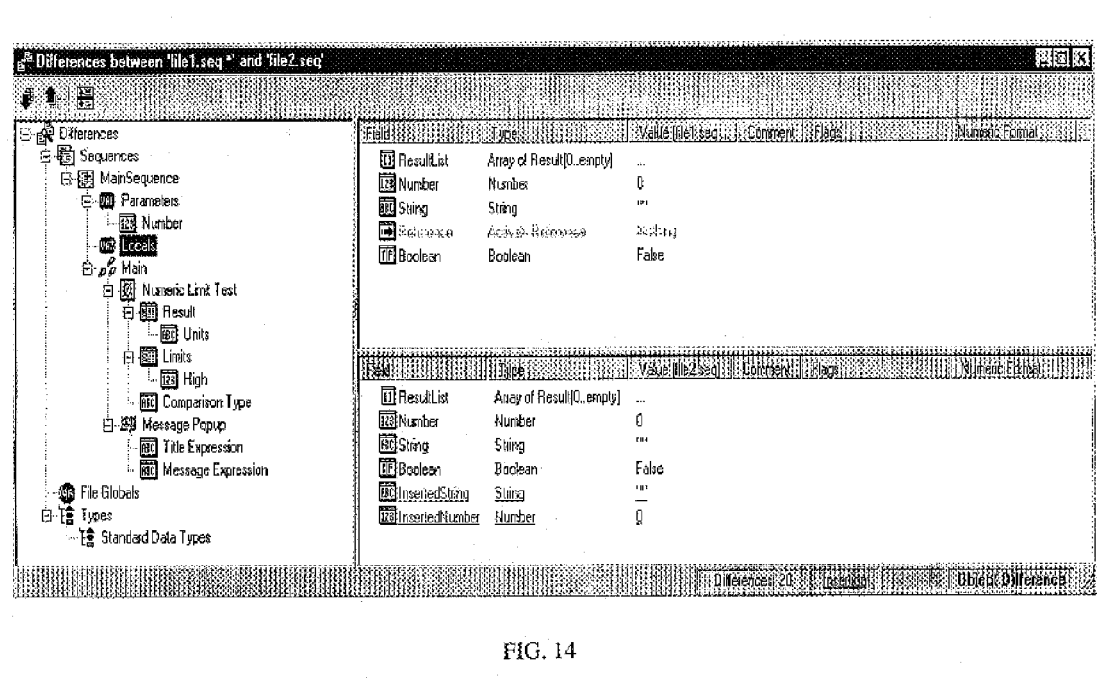

FIG. 14: Locals Differences

FIG. 14 is a screen shot of Locals differences, comparing a first sequence file and a second sequence file according to one embodiment of the present invention.

The left-side of the screen shot in FIG. 14 is similar to the left-side of the screen shot in FIG. 13. As shown in FIG. 14, the "Locals" element on the left-side of the screen shot is selected, thus the right-side of the screen shot may include child elements of the "Locals" parent element (e.g., ResultList, Number, String, Reference, Boolean, InsertedString, and InsertedNumber). It is noted that four of the child elements (i.e., ResultList, Number, String, and Boolean) are shown in standard (i.e., not Bold) text on both the top half (i.e., in the first sequence file, file1.seq) and the bottom half (i.e., in the second sequence file, file2.seq) of the right-side of the screen shot. Those child elements shown in standard text may indicate that no differences exist for those child elements, when comparing the two sequence files.

As shown in FIG. 14, the Reference parameter, shown in the top half of the right-side of the screen shot may be shown with a line drawn through the middle of the text, indicating that the parameter is a deletion. An insertion of two parameters or elements (i.e., an InsertedString parameter and an InsertedNumber parameter) is shown in the bottom half of the right-side of the screen shot, indicated by an underline underneath each parameter.

Figure 15:
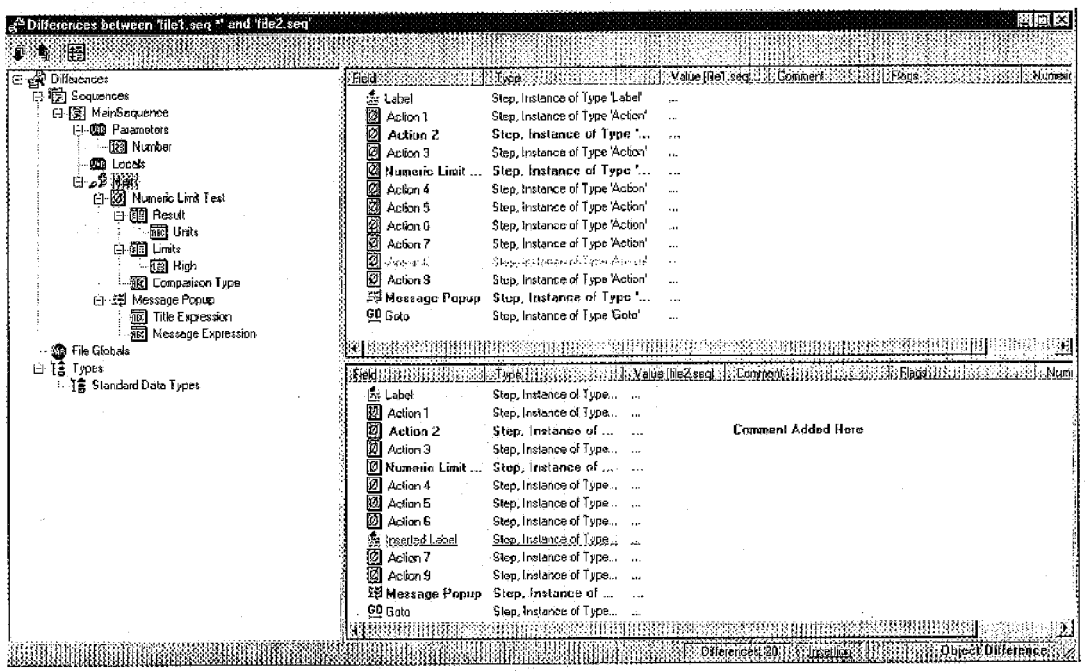
FIG. 15 is a screen shot of Main differences, comparing a first sequence file and a second sequence file according to one embodiment of the present invention.

FIG. 15: Main Differences

FIG. 15 is a screen shot of Main differences, comparing a first sequence file and a second sequence file according to one embodiment of the present invention.

The left-side of the screen shot in FIG. 15 is similar to the left-side of the screen shot in FIG. 14. As shown in FIG. 15, the "Main" element on the left-side of the screen shot is selected, thus the right-side of the screen shot may include child elements of the "Main" parent element (e.g., Label, Action 1, Action 2, Action 3, Numeric Limit, Action 4, Action 5, Action 6, Action 7, Action 8, Action 9, Message Popup, Goto, and Inserted Label). It is noted that the child elements shown in Bold on the right-side of the screen shot may indicate that further details may be available concerning differences for those bold elements. By selecting a Bold child element (e.g., Action 2, Numeric Limit, or Message Popup), a user may navigate to the screen shot containing details regarding differences for that Bold child element. The child elements shown in standard text on the right-side of the screen shot (e.g., Label, Action 1, Action 3, Action 4, Action 5, Action 6, Action 7, Action 9, and Goto) may indicate that no differences exist for these child elements, when comparing the two sequence files.

As shown in FIG. 15, the differences for the "Action 2" parameter are that the first sequence file (i.e., file1.seq) has no value specified in the Comment field, whereas the second sequence file (i.e., file2.seq) has a Value of "Comment Added Here" specified in the Comment field. The differences for the "Numeric Limit" parameter are not visible in the right-side of the screen shot; however, by looking at the left-side of the screen shot, it may be determined that the child elements of "Numeric Limit" are Result and Limits, and that the child element of Results is Units and the child element of Limits is High, thus the differences for the "Numeric Limit" parameter may be viewed by selecting the lowest level child element under the "Numeric Limit" parameter (i.e., Units and/or High). Similarly, the differences for the "Message Popup" parameter are not visible in the right-side of the screen shot. By looking at the left-side of the screen shot, it may be determined that the child elements of "Message Popup" are "Title Expression" and "Message Expression", thus the differences for the "Message Popup" parameter may be viewed by selecting one of the child elements shown under the "Message Popup" parameter on the left-side of the screen shot (i.e., "Title Expression" and/or "Message Expression").

The "Action 8" parameter, shown in the top half of the right-side of the screen shot may be shown with a line drawn through the middle of the text, indicating that the parameter is a deletion. An insertion of an "Inserted Label" parameter is shown in the bottom half of the right-side of the screen shot, indicated by an underline.

Figure 16:
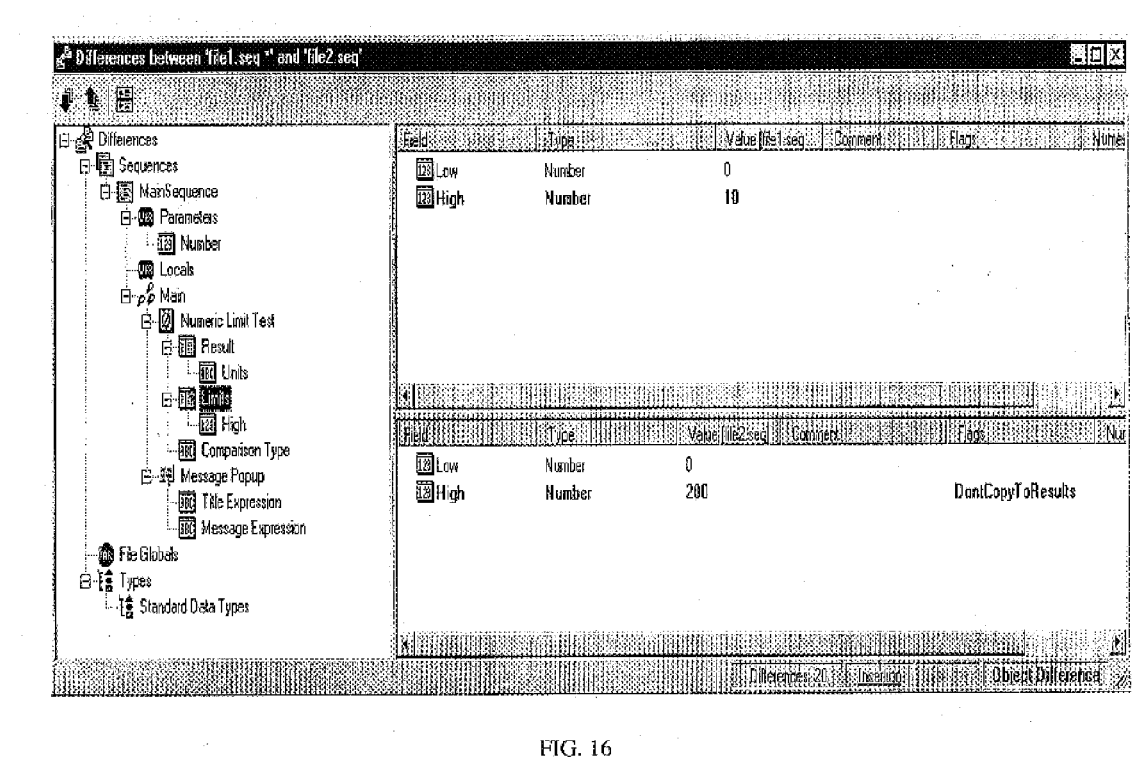

FIG. 16: Limits Differences

FIG. 16 is a screen shot of Limits differences, comparing a first sequence file and a second sequence file according to one embodiment of the present invention.

The left-side of the screen shot in FIG. 16 is similar to the left-side of the screen shot in FIG. 15. As shown in FIG. 16, the "Limits" element on the left-side of the screen shot is selected, thus the right-side of the screen shot may include child elements of the "Limits" parent element (e.g., Low and High). It is noted that the High child element shown in Bold on the right-side of the screen shot may indicate that further details may be available concerning differences for that bold element. By selecting a Bold child element (e.g., High), a user may navigate to the screen shot containing details regarding differences for that Bold child element. The Low child element shown in standard text on the right-side of the screen shot may indicate that no differences exist for that child element, when comparing the two sequence files.

As shown in FIG. 16, there are two differences for the "High" parameter: in the first sequence file (i.e., file1.seq) the Value field has a value of "10" and the Flags field is blank, whereas in the second sequence file (i.e., file2.seq) the Value field has a value of "200" and the Flags field contains "DontCopyToResults".

Figure 17:
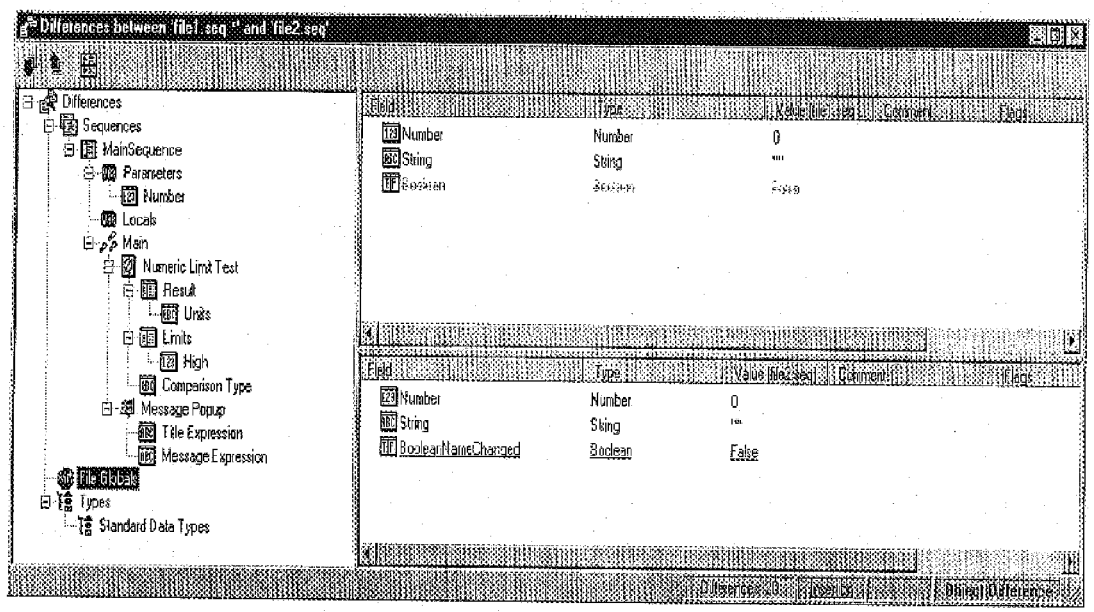
FIG. 17 is a screen shot of File Globals differences, comparing a first sequence file and a second sequence file according to one embodiment of the present invention.

FIG. 17: File Globals Differences

FIG. 17 is a screen shot of File Globals differences, comparing a first sequence file and a second sequence file according to one embodiment of the present invention.

The left-side of the screen shot in FIG. 17 is similar to the left-side of the screen shot in FIG. 16. As shown in FIG. 17, the "File Globals" element on the left-side of the screen shot is selected, thus the right-side of the screen shot may include child elements of the "File Globals" parent element (e.g., Number, String, Boolean, and BooleanNameChanged). It is noted that two of the child elements (i.e., Number and String) are shown in standard (i.e., not Bold) text on both the top half (i.e., in the first sequence file, file1.seq) and the bottom half (i.e., in the second sequence file, file2.seq) of the right-side of the screen shot. Those child elements shown in standard text may indicate that no differences exist for those child elements, when comparing the two sequence files.

As shown in FIG. 17, the Boolean File Global, shown in the top half of the right-side of the screen shot may be shown with a line drawn through the middle of the text, indicating that the parameter is a deletion. An insertion of one parameter or element (i.e., a BooleanNameChanged parameter) is shown in the bottom half of the right-side of the screen shot, indicated by an underline underneath the text for the BooleanNameChanged parameter. It is noted that all columns other than the "Field" column (i.e., Type, Value, Comment, and Flags columns) for the deleted Boolean File Global in the first sequence file and the inserted BooleanNameChanged parameter in the second sequence file are identical, in this example. In another embodiment of the present invention, using the same example of a Boolean File Global in the first sequence file and a BooleanNameChanged parameter in the second sequence file, rather than an insertion and a deletion of the parameter, as illustrated in FIG. 17, the difference may be indicated as a change to the parameter (e.g., indicated in Bold text).

Figure 18:
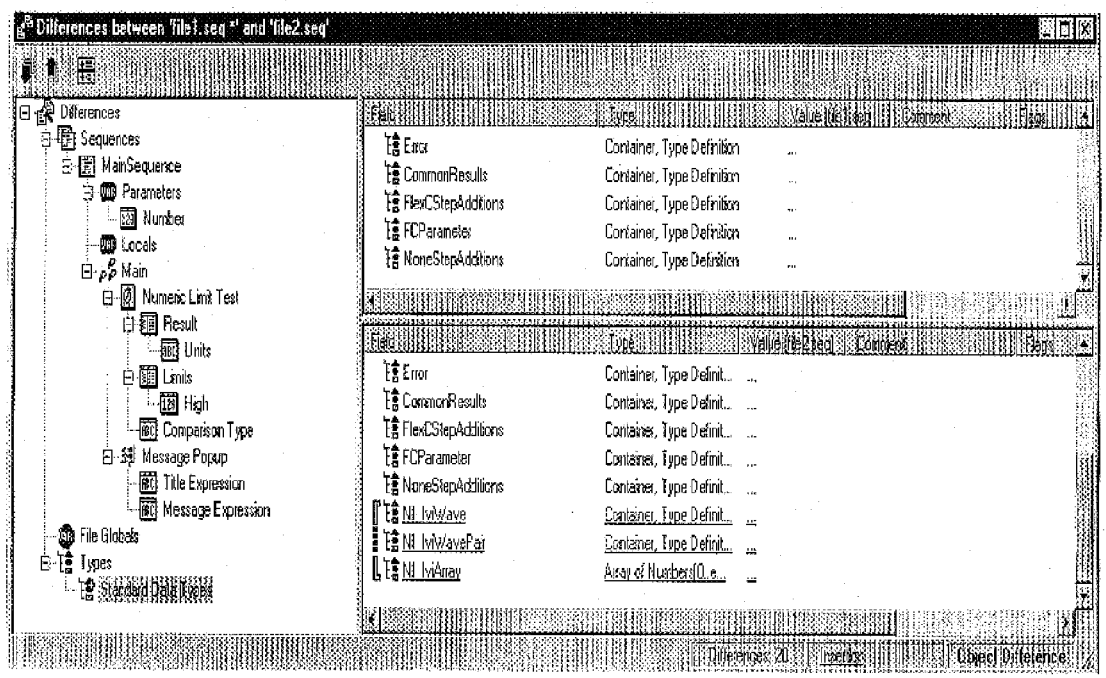
FIG. 18 is a screen shot of Standard Data Types differences, comparing a first sequence file and a second sequence file according to one embodiment of the present invention.

FIG. 18: Standard Data Types Differences

FIG. 18 is a screen shot of Standard Data Types differences, comparing a first sequence file and a second sequence file according to one embodiment of the present invention.

The left-side of the screen shot in FIG. 18 is similar to the left-side of the screen shot in FIG. 17. As shown in FIG. 18, the "Standard Data Types" element on the left-side of the screen shot is selected, thus the right-side of the screen shot may include child elements of the "Standard Data Types" parent element (e.g., Error, CommonResults, FlexCStepAdditions, FCParameter, NoneStepAdditions, NI_IviWave, NI_IviWavePair, and NI_IviArray). It is noted that five of the child elements (i.e., Error, CommonResults, FlexCStepAdditions, FCParameter, and NoneStepAdditions) are shown in standard (i.e., not Bold) text on both the top half (i.e., in the first sequence file, file1.seq) and the bottom half (i.e., in the second sequence file, file2.seq) of the right-side of the screen shot. Those child elements shown in standard text may indicate that no differences exist for those child elements, when comparing the two sequence files. As shown, the first sequence file, file1.seq, contains a sub-set of the data in the second sequence file, file2.seq, as all of the child elements shown in the top half of the right-side of the screen shot (i.e., the first sequence file data) are in standard text.

As shown in FIG. 18, an insertion of three parameters or elements (i.e., NI_IviWave, NI_IviWavePair, and NI_IviArray) is shown in the bottom half of the right-side of the screen shot, indicated by an underline underneath each parameter.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for detecting differences between first and second test executive sequence files in a computer system, the method comprising:

storing the first test executive sequence file and the second test executive sequence file in a computer memory, wherein said first test executive sequence file and said second test executive sequence file each comprise objects, wherein the first test executive sequence file objects are interrelated, and wherein the second test executive sequence file objects are interrelated;

determining differences between said first test executive sequence file and said second test executive sequence file, wherein determining differences between said first test executive sequence file and said second test executive sequence file comprises:

comparing the first test executive sequence file objects with the second test executive sequence file objects;

displaying an indication of said differences on a display;

wherein said differences are used to evaluate at least one of the first test executive sequence file and the second test executive sequence file.

2. The method of claim 1, wherein:

the first test executive sequence file objects comprise one or more of: a sequence; a global variable; and/or a data type; and the second test executive sequence file objects comprise one or more of: a sequence; a global variable; and/or a data type.

3. The method of claim 1, wherein:

the first test executive sequence file objects comprise one or more of: at least one sequence; at least one global variable; and/or at least one data type; and the second test executive sequence file objects comprise one or more of: at least one sequence; at least one global variable; and/or at least one data type.

4. The method of claim 1, wherein said first test executive sequence file comprises a first sequence, and wherein said second test executive sequence file comprises a second sequence.

5. The method of claim 4, wherein:

the first sequence comprises: at least one step, at least one parameter, and at least one local variable; and the second sequence comprises: at least one step, at least one parameter, and at least one local variable.

6. The method of claim 5, wherein:

the at least one step of the first sequence comprises a tree structure of step properties, wherein each step property comprises one or more of: a property value, one or more property flags, and/or a property comment; and the at least one step of the second sequence comprises a tree structure of step properties, wherein each step property comprises one or more of: a property value, one or more property flags, and/or a property comment.

7. The method of claim 1, wherein the first test executive sequence file objects and the second test executive sequence file objects share at least one common object.

8. The method of claim 7, wherein the common object further comprises a hierarchy of objects, and wherein the hierarchy of objects comprises a parent object and at least one child sub-object, wherein said determining differences comprises:

comparing the hierarchy of objects of the common object in the first test executive sequence file objects with the hierarchy of objects of the common object in the second test executive sequence file objects;

detecting differences between the hierarchy of objects of the common object in the first test executive sequence file objects and the hierarchy of objects of the common object in the second test executive sequence file objects; and wherein said displaying an indication comprises:

displaying an indication of the differences between the hierarchy of objects on a display.

9. The method of claim 8, further comprising:

navigating the indication of the differences between the hierarchy of objects to display details of the differences between the hierarchy of objects.

10. The method of claim 8, further comprising:
    displaying a type of difference for each displayed difference;
    wherein the type of difference is an insertion or a deletion; and
    displaying a count of differences.

11. A computer-implemented method for detecting differences between a first test executive sequence file and a second test executive sequence file in a computer system, the method comprising:
    storing the first test executive sequence file in a computer memory, wherein the first test executive sequence file comprises a first plurality of objects, wherein the first plurality of objects are interrelated;
    storing the second test executive sequence file in a computer memory, wherein the second test executive sequence file comprises a second plurality of objects, wherein the second plurality of objects are interrelated;
    comparing the first plurality of objects in the first test executive sequence file with the second plurality of objects in the second test executive sequence file;
    detecting differences between the first plurality of objects and the second plurality of objects; and
    displaying an indication of the differences on a display.

12. The method of claim 13, wherein:
    the first plurality of objects comprise one or more of: a sequence; a global variable; and/or a data type; and
    the second plurality of objects comprise one or more of: a sequence; a global variable; and/or a data type.

13. The method of claim 11, wherein:
    the first plurality of objects comprise one or more of: at least one sequence; at least one global variable; and/or at least one data type; and
    the second plurality of objects comprise one or more of: at least one sequence; at least one global variable; and/or at least one data type.

14. The method of claim 13, wherein:
    the first plurality of objects comprise a first sequence, wherein the first sequence comprises: at least one step, at least one parameter, and at least one local variable; and
    the second plurality of objects comprise a second sequence, wherein the second sequence comprises: at least one step, at least one parameter, and at least one local variable.

15. The method of claim 14, wherein:
    the at least one step of the first sequence comprises a tree structure of step properties, wherein each step property comprises one or more of: a property value, one or more property flags, and/or a property comment; and
    the at least one step of the second sequence comprises a tree structure of step properties, wherein each step property comprises one or more of: a property value, one or more property flags, and/or a property comment.

16. The method of claim 11, wherein the first plurality of objects and the second plurality of objects share at least one common object.

17. The method of claim 16, wherein the common object further comprises a hierarchy of objects, and wherein the hierarchy of objects comprises a parent object and at least one child sub-object, wherein said determining differences comprises:
    comparing the hierarchy of objects of the common object in the first plurality of objects with the hierarchy of objects of the common object in the second plurality of objects;
    detecting differences between the hierarchy of objects of the common object in the first plurality of objects and the hierarchy of objects of the common object in the second plurality of objects; and
    wherein said displaying an indication comprises:
        displaying an indication of the differences between the hierarchy of objects of the common object in the first plurality of objects and the hierarchy of objects of the common object in the second plurality of objects on a display.

18. The method of claim 17, further comprising:
    navigating the indication of the differences to display details of the differences.

19. The method of claim 17, further comprising:
    displaying a type of difference for each displayed difference;
    wherein the type of difference is an insertion or a deletion; and
    displaying a count of differences.

20. A memory medium comprising program instructions for detecting differences between first and second test executive sequence files in a computer system, wherein the program instructions are executable to implement:
    storing the first test executive sequence file and the second test executive sequence file in a computer memory, wherein said first test executive sequence file and said second test executive sequence file each comprise objects, wherein the first test executive sequence file objects are interrelated, and wherein the second test executive sequence file objects are interrelated;
    determining differences between said first test executive sequence file and said second test executive sequence file, wherein determining differences between said first test executive sequence file and said second test executive sequence file comprises:
        comparing the first test executive sequence file objects with the second test executive sequence file objects; and
    displaying an indication of said differences on a display;
    wherein said differences are used to evaluate at least one of the first test executive sequence file and the second test executive sequence file.

21. A memory medium comprising program instructions for detecting differences between a first test executive sequence file and a second test executive sequence file in a computer system, wherein the memory medium stores:
    the first test executive sequence file, wherein the first test executive sequence file comprises a first plurality of objects, wherein the first plurality of objects are interrelated;
    the second test executive sequence file, wherein the second test executive sequence file comprises a second plurality of objects, wherein the second plurality of objects are interrelated;
    wherein the program instructions are executable to implement:
    comparing the first plurality of objects in the first test executive sequence file with the second plurality of objects in the second test executive sequence file;
    detecting differences between the first plurality of objects and the second plurality of objects; and
    displaying an indication of the differences on a display.

* * * * *